(12) United States Patent
Fukasawa et al.

(10) Patent No.: US 9,794,447 B2
(45) Date of Patent: Oct. 17, 2017

(54) SERVICE PROVIDING SYSTEM, COOPERATION PROCESSING METHOD, AND INFORMATION PROCESSING SYSTEM

(71) Applicants: Naoki Fukasawa, Kanagawa (JP); Kiyohiro Hyo, Tokyo (JP); Hiroki Asakimori, Tokyo (JP)

(72) Inventors: Naoki Fukasawa, Kanagawa (JP); Kiyohiro Hyo, Tokyo (JP); Hiroki Asakimori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/276,945

(22) Filed: Sep. 27, 2016

(65) Prior Publication Data
US 2017/0094119 A1  Mar. 30, 2017

(30) Foreign Application Priority Data

Sep. 30, 2015 (JP) ................................. 2015-194993
Jan. 26, 2016 (JP) ................................. 2016-012743
Jul. 1, 2016 (JP) ................................. 2016-131737

(51) Int. Cl.
*H04N 1/44* (2006.01)
*H04N 1/00* (2006.01)

(52) U.S. Cl.
CPC ......... *H04N 1/4413* (2013.01); *H04N 1/0023* (2013.01); *H04N 1/00344* (2013.01);
(Continued)

(58) Field of Classification Search
CPC ............. H04N 1/4413; H04N 1/00344; H04N 1/00347; H04N 1/0023; H04N 1/4426;
(Continued)

(56) References Cited

U.S. PATENT DOCUMENTS 9,207,897 B2    12/2015  Takatsu et al.
2014/0146355 A1*  5/2014  Kawara ................. G06F 3/1288
                                                         358/1.15
(Continued)

FOREIGN PATENT DOCUMENTS

JP    2013-242848    12/2013
JP    2015-060247    3/2015

*Primary Examiner* — Allen H Nguyen
(74) *Attorney, Agent, or Firm* — IPUSA, PLLC

(57) ABSTRACT

A service providing system provides a service in which information processing apparatuses and an image forming apparatus cooperate with each other to execute processes for performing printing. The service providing system includes processors configured to execute the processes; a flow controller configured to accept, from one of the information processing apparatuses, a print execution request to execute printing in the image forming apparatus, and to cause the processors to issue a print instruction to be provided to the image forming apparatus, based on flow settings and parameter settings of the processes included in the print execution request; and a print instruction distributor configured to distribute the print instruction to the image forming apparatus based on a print instruction acquisition request from the image forming apparatus. The processors include a print instructor configured to issue the print instruction and to store the print instruction in the print instruction distributor.

9 Claims, 37 Drawing Sheets

(52) U.S. Cl.
CPC ..... *H04N 1/00347* (2013.01); *H04N 1/00464* (2013.01); *H04N 1/444* (2013.01); *H04N 1/4426* (2013.01); *H04N 2201/0094* (2013.01)

(58) Field of Classification Search
CPC ............... H04N 1/444; H04N 1/00464; H04N 2201/0094
USPC ....................................................... 358/1.14
See application file for complete search history.

(56) References Cited

U.S. PATENT DOCUMENTS

| | | | |
|---|---|---|---|
| 2015/0077776 A1 | 3/2015 | Hori | |
| 2015/0242161 A1* | 8/2015 | Kitagata | .............. G06K 15/408 358/1.14 |

* cited by examiner

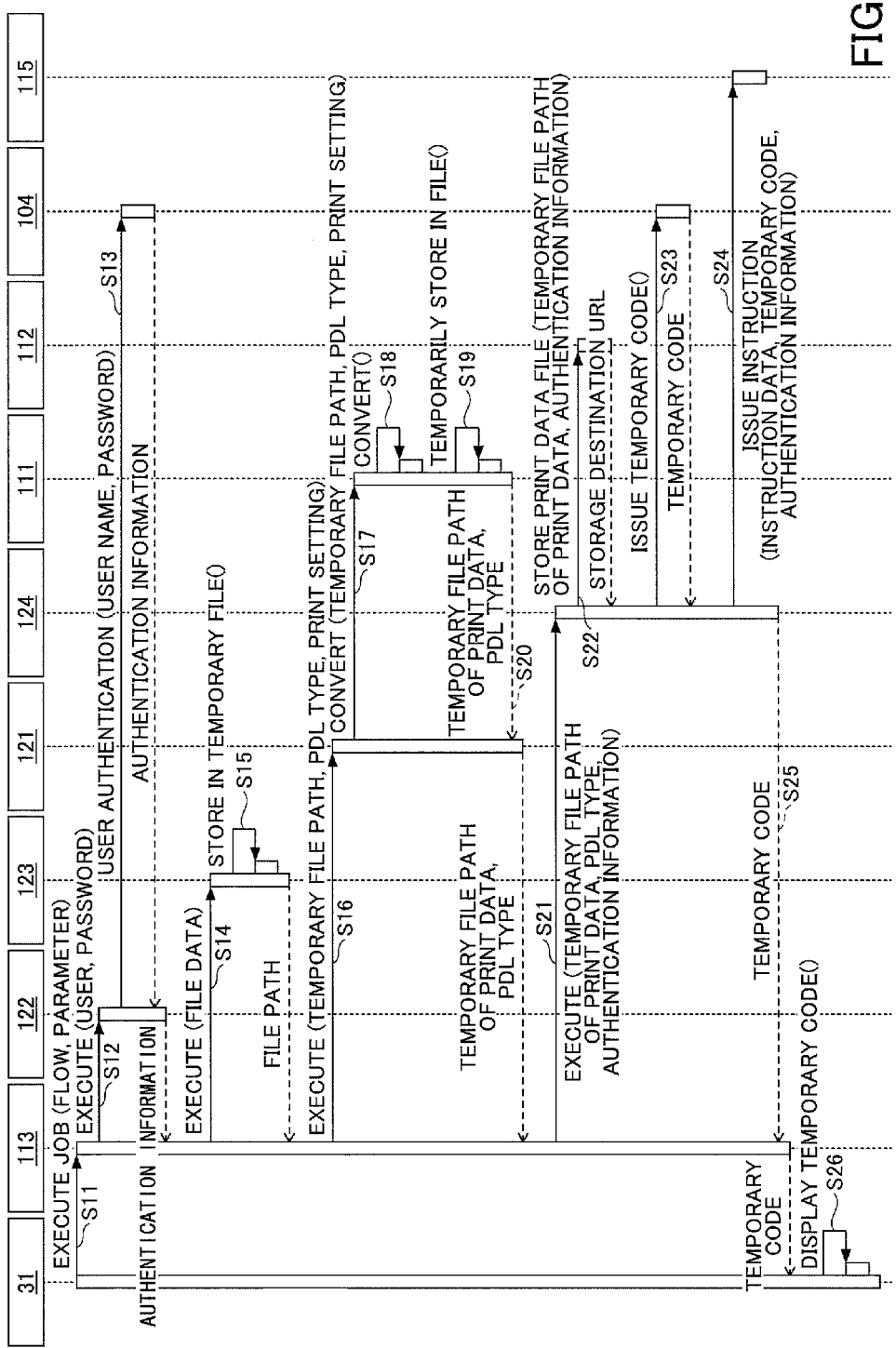

FIG.6

```
POST /applications/sampleapp/workflow HTTP/1.1
Authorization:Basic XFDFSDfsdfdsfsdfdsfsdfsd
Content-Type:multipart/form-data; boundary=----sfN4yQAoho6iHnFo
--------sfN4yQAoho6iHnFo
Content-Disposition: form-data; name=workflow"
Content-Type: application/json
[
  {
    "component": "auth",
    "params": [
      "username": "user",
      "password": "password"
    ],
    "next": "print_command"
  },
  {
    "component": "file_input",
    "params": [
      "name": "samplefile"
    ],
    "next": "print_convert"
  },
  {
    "component": "print_convert",
    "params": [
      "pdl": "postscript",
      "copies": 1,
      "colormode": "color",
      "papersize": "a4",
      "2sided": "leftbinding"
      "layout": "2in1",
    ],
    "next": "print_command"
  },
  {
    "component": "print_command",
    "params": [
      "description": "PRINT sample",
      "created_at": "2015-07-08T09:41:01.845Z"
    }
  },
]
--------sfN4yQAoho6iHnFo
Content-Disposition: form-data; name="samplefile"; filename="sample.docx"
Content-Type: application/octet-stream

:

--------sfN4yQAoho6iHnFo--
```

REFER (from "samplefile" to "name": "samplefile")

FLOW SETTING AND PARAMETER

ACTUALLY DATA OF FILE IS INPUT

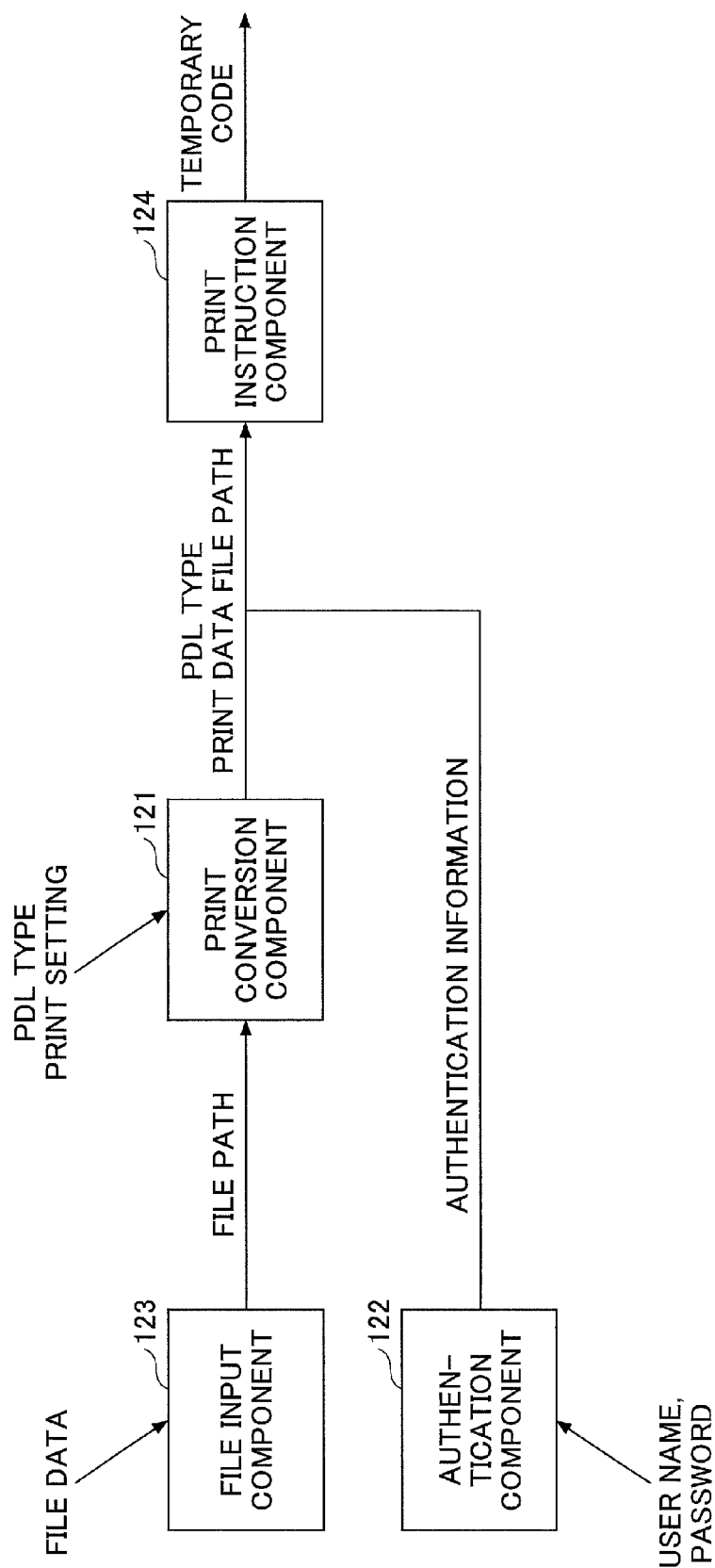

FIG.8

```
[
"description": "PRINT sample",
"created_at": "2015-07-08T09:41:01.845Z",
"type": "print",
"pdl": "postscript",
"fileurl": "https://xxx/xxx/sample.ps"
]
```

FIG.9

```
[
"id": "979be375-88ec-4d6b-ae43-fa51f9370682",
"description": "PRINT sample",
"created_at": "2015-07-08T09:41:01.845Z",
"updated_at": "2015-07-08T09:41:01.845Z",
"status": "created",
"type": "print",
"pdl": "postscript",
"fileurl": "https://xxx/xxx/sample.ps"
]
```

FIG.15

```
{
"id": "979be375-88ec-4d6b-ae43-fa51f9370682",
"description": "PRINT sample",
"created_at": "2015-07-08T09:41:01.845Z",
"updated_at": "2015-07-08T09:48:35.916Z",
"status": "processing",
"type": "print",
"pdl": "postscript",
"fileurl": "https://xxx/xxx/sample.ps"
}
```

FIG.16

```
{
"id": "979be375-88ec-4d6b-ae43-fa51f9370682",
"description": "PRINT sample",
"created_at": "2015-07-08T09:41:01.845Z",
"updated_at": "2015-07-08T09:48:35.916Z",
"status": "processing",
"type": "print",
"pdl": "postscript",
"fileurl": "https://xxx/xxx/sample.ps",
"accessToken": "f09bab88-905b-4022-97aa-41deccaf39d4"
}
```

FIG.17

```
{
"id": "979be375-88ec-4d6b-ae43-fa51f9370682",
"description": "PRINT sample",
"created_at": "2015-07-08T09:41:01.845Z",
"updated_at": "2015-07-08T09:49:03.162Z",
"status": "completed",
"type": "print",
"pdl": "postscript",
"fileurl": "https://xxx/xxx/sample.ps",
"accessToken": "f09bab88-905b-4022-97aa-41deccaf39d4"
}
```

FIG.22

```
[
  {
    "id": "979be375-88ec-4d6b-ae43-fa51f9370682",
    "description": "PRINT sample",
    "created_at": "2015-07-08T09:41:01.845Z",
    "updated_at": "2015-07-08T09:41:01.845Z",
    "status": "created",
    "type": "print",
    "pdl": "postscript",
    "fileurl": "https://xxx/xxx/sample.ps"
  },
  {
    "id": "25307b0a-8a31-45f8-979c-956cf6f0d3a9",
    "description": "PRINT JOB 2",
    "created_at": "2015-07-04T13:54:31.385Z",
    "updated_at": "2015-07-04T13:54:31.385Z ",
    "status": "created",
    "type": "print",
    "pdl": "pcl6",
    "fileurl": "https://xxx/xxx/printjob2.pcl"
  },
  {
    "id": "3f70c6f4-f8d0-4d7d-a436-3f4b8c0455ff",
    "description": "PRINT sample",
    "created_at": "2015-06-15T20:43:52.912Z",
    "updated_at": "2015-06-16T09:34:41.158Z",
    "status": "canceled",
    "type": "print",
    "pdl": "postscript",
    "fileurl": "https://xxx/xxx/printjob3.ps"
  }
]
```

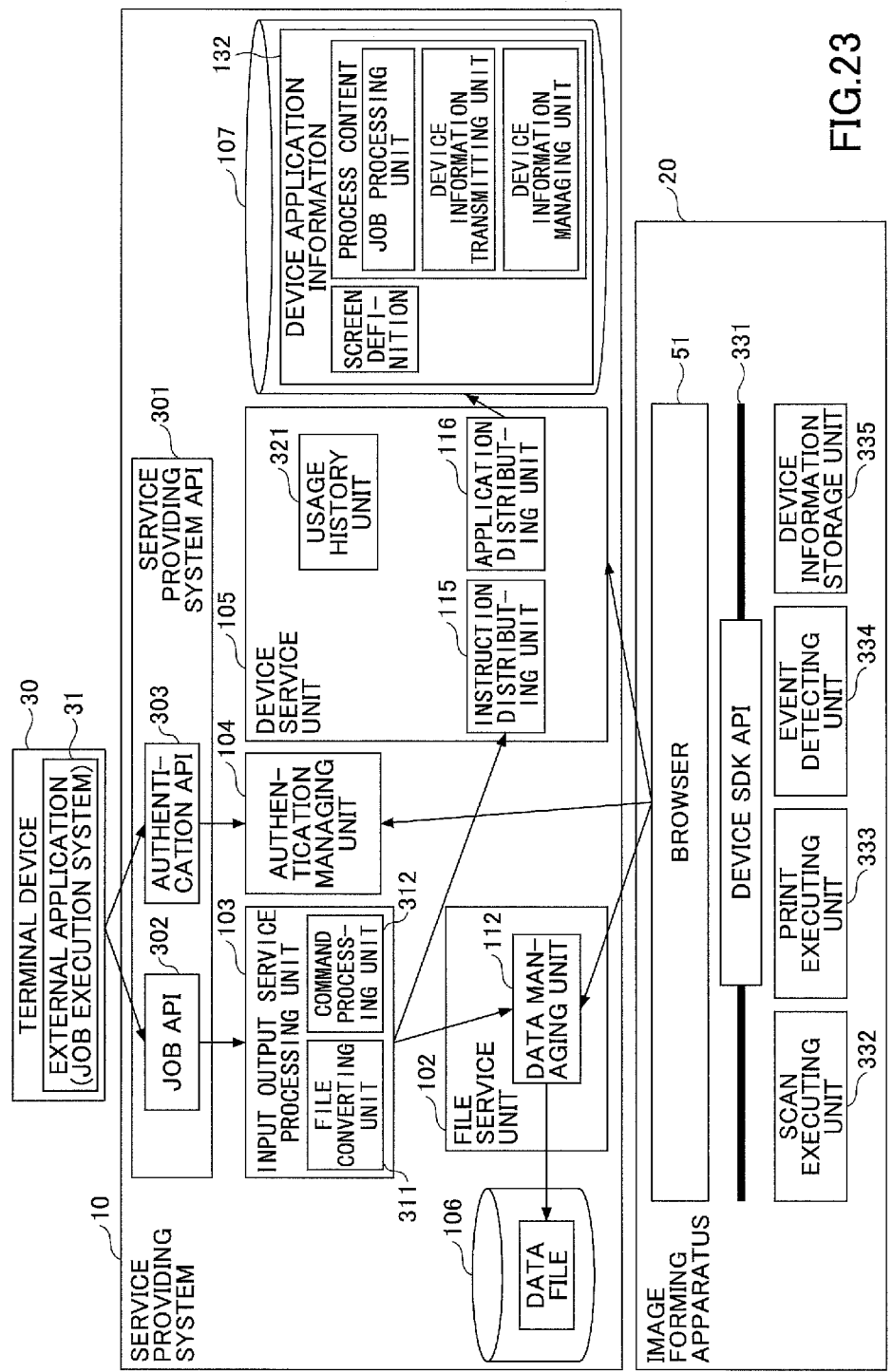

FIG.25

■FILE REGISTRATION Request

POST /print/files HTTP/1.1
Token: [AUTHENTICATION TOKEN]
Content-Type: application/pdf

** FILE IMAGE ***

■FILE REGISTRATION Response

HTTP/1.1 201 Created
Location: https://example.xxx.com/print/files/sample123.pdf {
  "url": "https://example.xxx.com/print/files/sample123.pdf",
  "name": "sample123.pdf"
}

FIG.26

■COMMAND REGISTRATION Request

POST /print/commands HTTP/1.1
Token: [AUTHENTICATION TOKEN]

```
{
  "description": "Print Job",
  "parameters":{
    "pdlType": "rpcs"
  },
  "source": {
    "sourceType": "file",
    "fileDetails": {
      "files": [{"url":"https://example.xxx.com/print/files/sample123.pdf","name":"sample123.pdf"}]
    }
  }
}
```

■COMMAND REGISTRATION Response

HTTP/1.1 201 Created
Location: https://example.xxx.com/print/commands/3f87220c-aa72-48e4-b03e-130e8a15c3e0

```
{
  "pinCode": "123456789"
  "command": {
    "id": "3f87220c-aa72-48e4-b03e-130e8a15c3e0"
    "description": "Print Job",
    "createdAt": "2015-07-07T07:07.000Z",
    "updatedAt": "2015-07-07T07:07.000Z",
    "status": "created",
    "parameters":{
      "pdlType": "rpcs"
    },
    "source": {
      "sourceType": "file",
      "fileDetails": {
        "files": [{"url":"https://example.xxx.com/print/files/sample123.pdf","name":"sample123.pdf"}]
      }
    }
  }
}
```

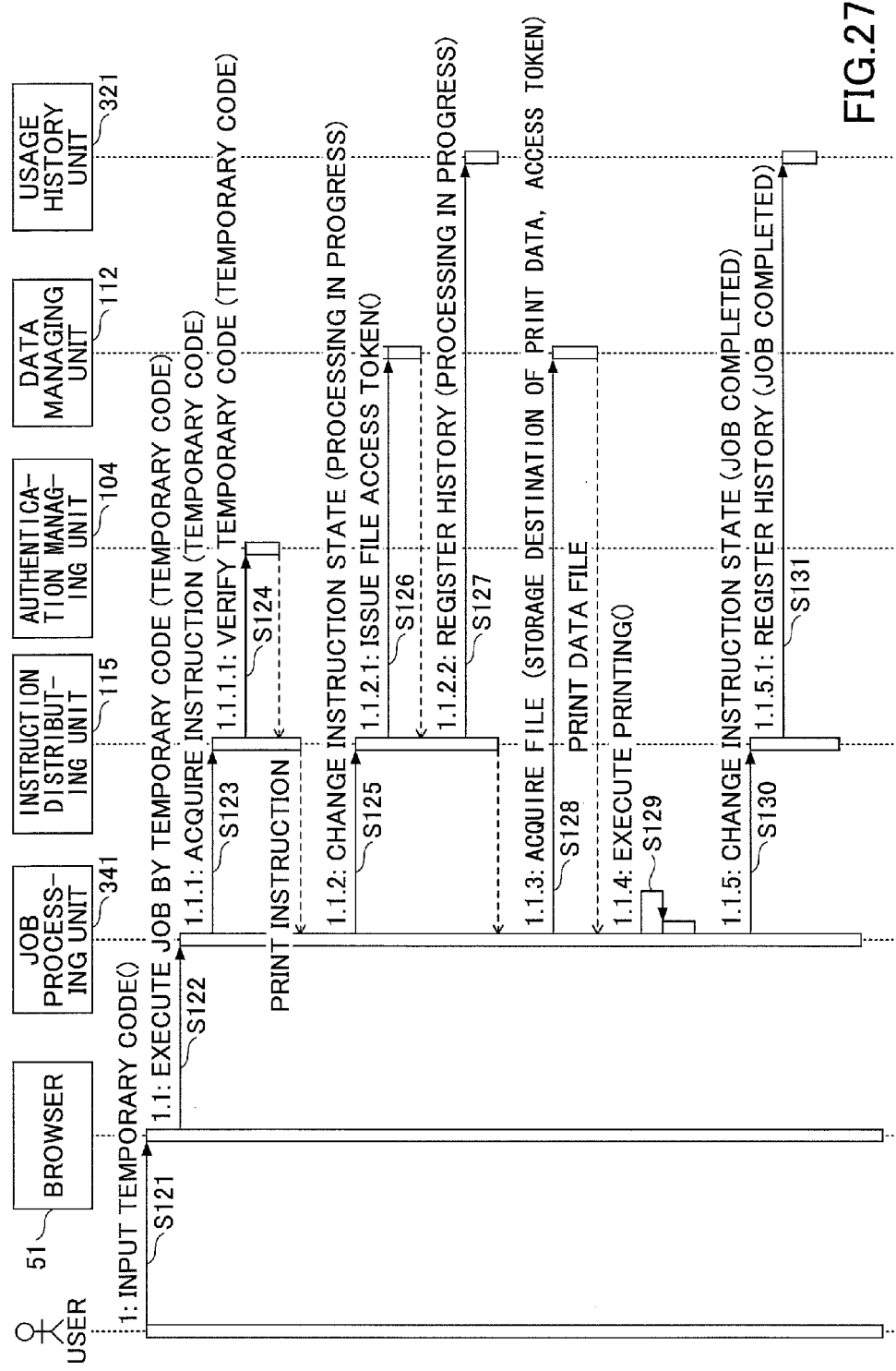

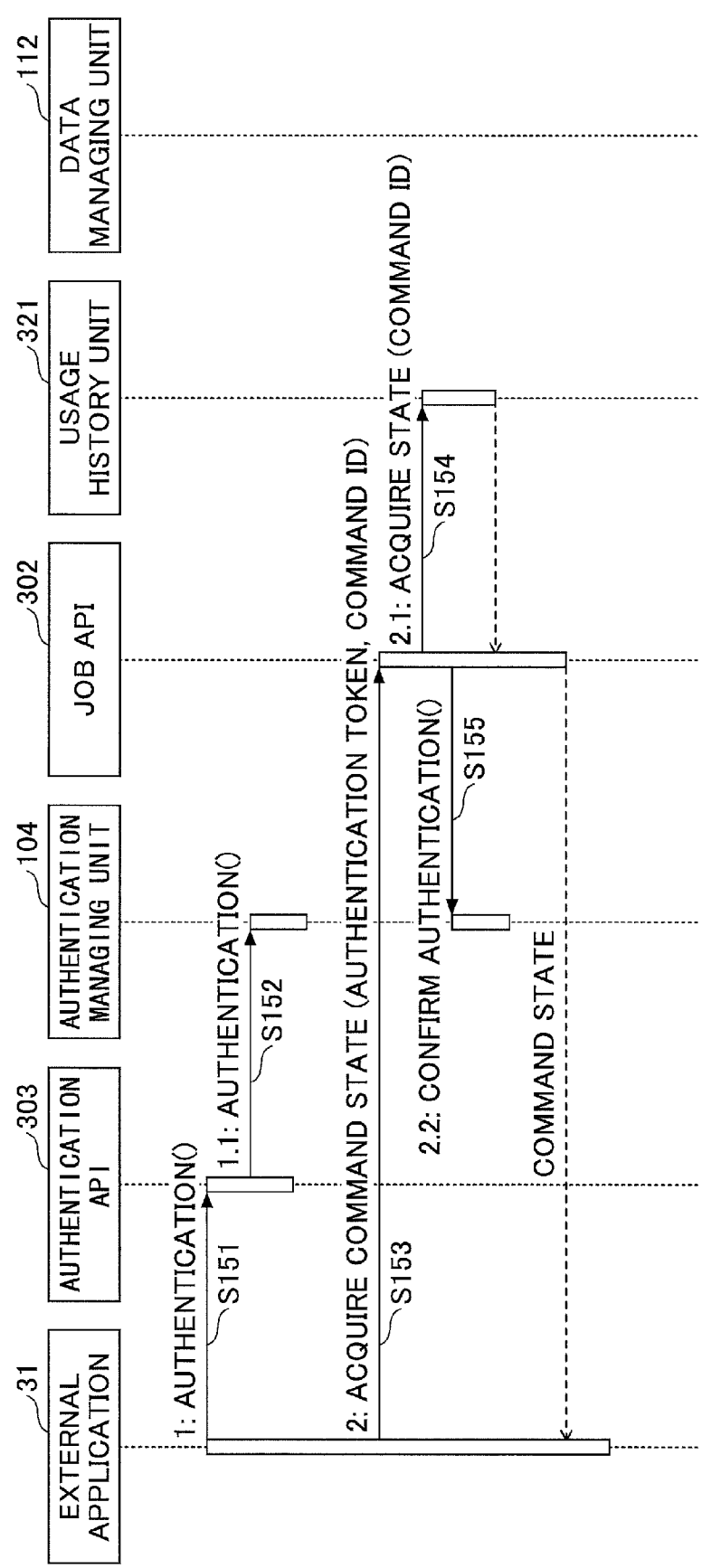

FIG.29A

■COMMAND STATE ACQUISITION Request

GET /print/commands/3f87220c-aa72-48e4-b03e-130e8a15c3e0 HTTP/1.1
Token: [AUTHENTICATION TOKEN]

FIG.29B

■COMMAND STATE ACQUISITION Response

HTTP/1.1 200 OK

```
{
 "id": "3f87220c-aa72-48e4-b03e-130e8a15c3e0",
 "description": "Print Job",
 "createdAt": "2015-07-07T07:07.000Z",
 "updatedAt": "2015-07-07T08:12.000Z",
 "status": "completed",
 "parameters":{
   "type": "rpcs"
 },
 "source": {
   "sourceType": "file",
   "fileDetails": {
     "files": [{"url": "https://example.xxx.com/print/files/sample123.pdf", "name": "sample123.pdf"}]
   }
 }
}
```

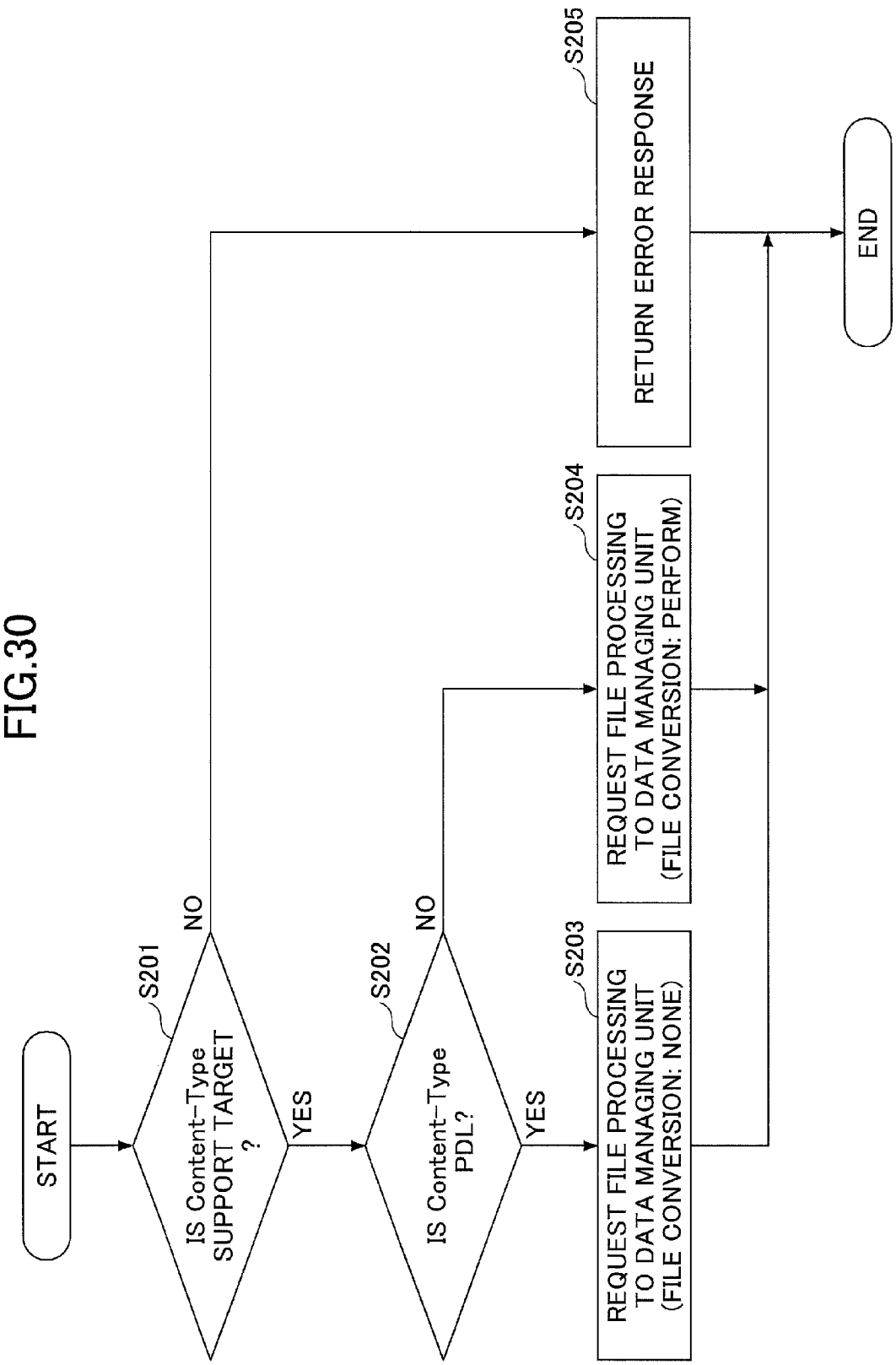

FIG.31

■EXAMPLE OF JPEG (IN CASE OF OTHER FORMAT, Content-Type CHANGES)
POST /print/files HTTP/1.1
Token: [AUTHENTICATION TOKEN]
Content-Type: image/jpeg

*** FILE IMAGE ***

■IN CASE OF PDL (IN CASE OF OTHER PDL, Content-Type CHANGES)
POST /print/files HTTP/1.1
Token: [AUTHENTICATION TOKEN]
Content-Type:application/x-pcl

FIG.35

| FILE INFORMATION |
| PRINT SETTING |
| PRINT DATA |

FIG.36

| KEYWORD |
|---|
| 1000 |
| 1001 |
| 1002 |

FIG.37

| IMAGE FORMING APPARATUS | KEYWORD | POSITION INFORMATION | SUBSTITUTE DEVICE |
|---|---|---|---|
| Abcdefg1000 | 1000 | A | |
| Abcdefg1001 | 1001 | B | Abcdefg1000 |
| Abcdefg1002 | 1002 | C | Abcdefg1001 |

SERVICE PROVIDING SYSTEM, COOPERATION PROCESSING METHOD, AND INFORMATION PROCESSING SYSTEM

CROSS-REFERENCE TO RELATED APPLICATION

The present application claims the benefit of priority under 35 U.S.C. §119 of Japanese Patent Application No. 2015-194993, filed on Sep. 30, 2015, Japanese Patent Application No. 2016-012743, filed on Jan. 26, 2016, and Japanese Patent Application No. 2016-131737, filed on Jul. 1, 2016, the contents of which are incorporated herein by reference in their entirety.

BACKGROUND OF THE INVENTION

1. Field of the Invention

The present invention relates to a service providing system, a cooperation processing method, and an information processing system.

2. Description of the Related Art

In recent years, various services have been provided owing to the progress of the technology of cloud computing, etc. For example, there is known a printing system of the related art, in which a print job received from a personal computer (PC), etc., is stored in an information processing apparatus such as a print server, etc. After the user logs in, the user selects a print job from a list of print jobs, and the selected print job is printed by an image forming apparatus (see, for example, Patent Document 1).

As described above, there is known a technology of the related art in which an image forming apparatus and a service such as a cloud service cooperate with each other to perform a process.

Patent Document 1: Japanese Unexamined Patent Application Publication No. 2013-242848

SUMMARY OF THE INVENTION

An aspect of the present invention provides a service providing system, a cooperation processing method, and an information processing system in which one or more of the above-described disadvantages are reduced.

According to one aspect of the present invention, there is provided a service providing system including a plurality of information processing apparatuses, the service providing system providing a service in which the plurality of information processing apparatuses and an image forming apparatus cooperate with each other to execute a series of processes for performing printing, the service providing system including a plurality of processors configured to execute, by a computer, the series of processes for performing printing in the image forming apparatus; a flow controller configured to accept, from one of the plurality of information processing apparatuses over a communication channel, a print execution request to execute printing in the image forming apparatus, and to cause the plurality of processors to issue a print instruction to be provided to the image forming apparatus, based on a flow setting and a parameter setting of the series of processes for performing printing included in the print execution request; and a print instruction distributor configured to distribute, over the communication channel, the print instruction to the image forming apparatus based on a print instruction acquisition request to acquire the print instruction received from the image forming apparatus over the communication channel, the print instruction acquisition request being generated according to information input to a screen of a user interface included in the image forming apparatus by a user, wherein the plurality of processors include a print instructor configured to issue the print instruction and to store the issued print instruction in a storage device of the print instruction distributor.

BRIEF DESCRIPTION OF THE DRAWINGS

Other objects, features and advantages of the present invention will become more apparent from the following detailed description when read in conjunction with the accompanying drawings, in which:

FIG. 5 is a sequence diagram illustrating an example of a print instruction input process according to the first embodiment of the present invention;

FIG. 6 is a configuration diagram illustrating an example of a job execution request input to a service providing system according to the first embodiment of the present invention;

FIG. 7 is a diagram illustrating an example of a data flow between the respective components according to the first embodiment of the present invention;

FIG. 8 is a configuration diagram illustrating an example of print instruction data registered in an instruction distributing unit according to the first embodiment of the present invention;

FIG. 9 is a configuration diagram illustrating an example of the processed print instruction data according to the first embodiment of the present invention;

FIG. 15 is a configuration diagram illustrating an example of print instruction data in which the state has been changed to processing in progress according to the first embodiment of the present invention;

FIG. 16 is a configuration diagram illustrating an example of print instruction data including an access token according to the first embodiment of the present invention;

FIG. 17 is a configuration diagram illustrating an example of print instruction data in which the state has been changed to completed according to the first embodiment of the present invention;

FIG. 22 is a configuration diagram of an example of a list of print instruction data items returned to a print job processing unit from an instruction distributing unit according to the second embodiment of the present invention;

FIG. 23 is a process block diagram of an example of the information processing system according to a third embodiment of the present invention;

FIG. 25 is a configuration diagram of an example of a file registration request and a file registration response according to the third embodiment of the present invention;

FIG. 26 is a configuration diagram illustrating an example of a command registration request and a command registration response according to the third embodiment of the present invention;

FIG. 27 is a sequence diagram illustrating an example of a print job execution process according to the third embodiment of the present invention;

FIG. 28 is a sequence diagram illustrating an example of a command state acquisition process according to the third embodiment of the present invention;

FIGS. 29A and 29B are configuration diagrams illustrating examples of a command state acquisition request and a command state acquisition response according to the third embodiment of the present invention;

FIG. 30 is a flowchart of an example of processing procedures by a command processing unit according to the third embodiment of the present invention;

FIG. 31 is a diagram illustrating an example in which the "Content-Type" in the file registration request is Joint Photographic Experts Group (JPEG) and an example in which the "Content-Type" in the file registration request is PDL according to the third embodiment of the present invention;

FIG. 35 is a configuration diagram of an example of a print job to be registered according to the fourth embodiment of the present invention;

FIG. 36 is a configuration diagram of an example of a keyword table according to the fourth embodiment of the present invention;

FIG. 37 is a configuration diagram of an example of association information according to the fourth embodiment of the present invention;

DETAILED DESCRIPTION OF THE PREFERRED EMBODIMENTS

In the related art, in order for the image forming apparatus and a service such as a cloud service to perform a process in cooperation with each other, an application to be installed in the image forming apparatus needs to be developed. The development of an application to be installed in the image forming apparatus has been difficult for a general web developer.

A problem to be solved by an embodiment of the present invention is to provide a service providing system capable of supporting the development of a service to perform a process in cooperation with an image forming apparatus.

Embodiments of the present invention will be described by referring to the accompanying drawings.

First Embodiment

System Configuration—First Embodiment

Figure 1:
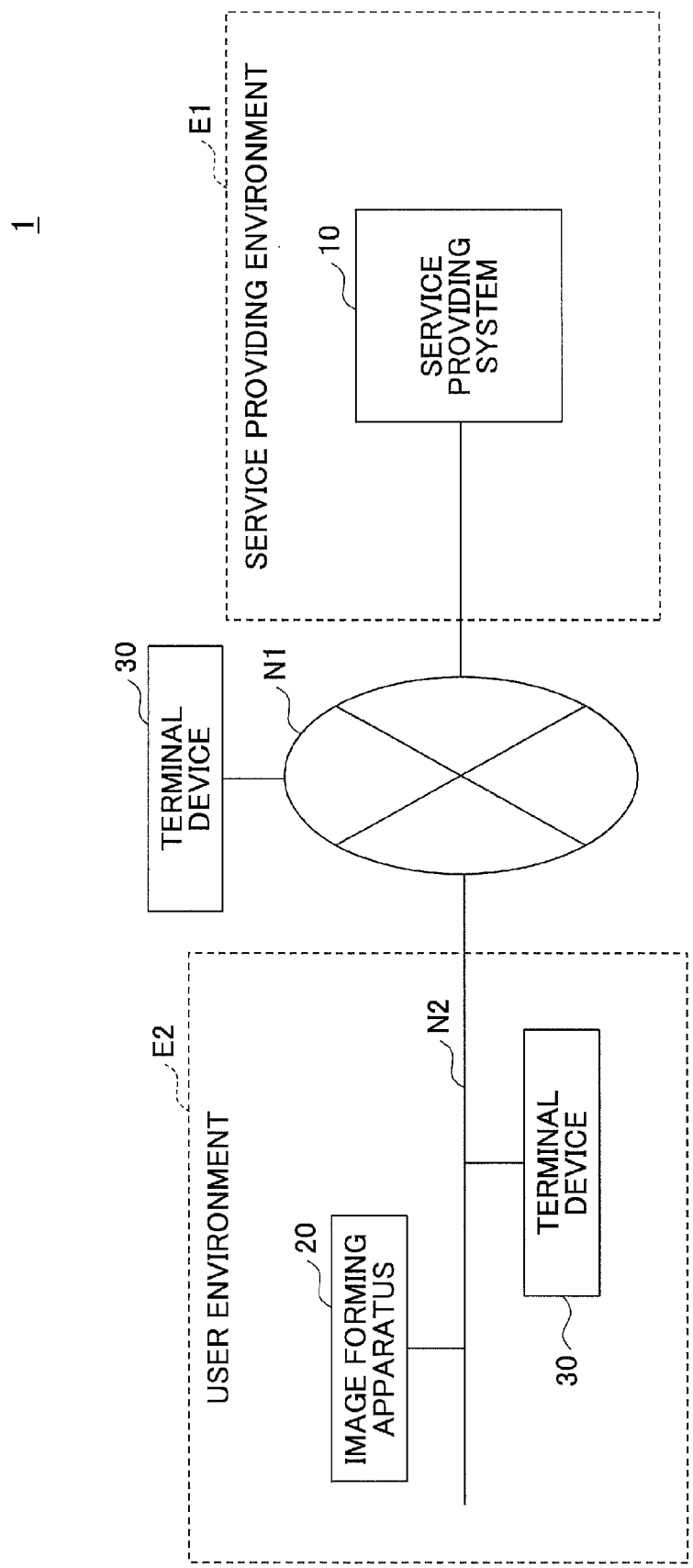
FIG. 1 is a configuration diagram illustrating an example of an information processing system according a first embodiment of the present invention.

FIG. 1 is a configuration diagram illustrating an example of an information processing system according a first embodiment of the present invention. An information processing system 1 illustrated in FIG. 1 includes a service providing environment E1 and a user environment E2 that are communicatively connected to each other via a wide-area network N1 such as the Internet.

The service providing environment E1 is a system environment that provides services such as a cloud service via the network N1. In the present embodiment, a cloud service is taken as an example of a service; however, the service may be a service provided by an Application Service Provide (ASP) or a Web service.

The service providing environment E1 includes a service providing system 10 realized by one or more information processing apparatuses. The service providing system 10 provides a predetermined service via the network N1. The service providing environment E1 may include a plurality of information processing apparatuses to cooperate with each other to execute processes.

For example, the service providing system 10 provides a service (cloud print service) of printing a stored electronic file with an image forming apparatus 20 in the user environment E2. In the information processing system 1 according to the first embodiment, it is assumed that the service providing system 10 provides a cloud print service as described above.

Note that all of or part of the service providing system 10 may be disposed in the user environment E2. That is, all of or some of the information processing apparatuses constituting the service providing system 10 may be included in the user environment E2.

The user environment E2 is a system environment of, for example, a company, etc., which is a user using the image forming apparatus 20. In the user environment E2, the image forming apparatus 20 and a terminal device 30 are connected via a network N2 such as a Local Area Network (LAN). The image forming apparatus 20 according to the first embodiment is a device having a print function. Note that the image forming apparatus 20 may be an electronic device such as a multifunction peripheral including a scan function, a copy function, and a fax communication function other than the print function. The terminal device 30 according to the first embodiment is a device that is operable by the user, such as a desktop PC in which a general-purpose operating system (OS) is installed, a notebook PC, a smartphone, a mobile phone, and a tablet PC.

The configuration of the information processing system 1 illustrated in FIG. 1 is one example; the information processing system 1 may have other configurations. For example, a plurality of image forming apparatuses 20 may be included. Furthermore, the terminal device 30 may be connected to the network N1.

Hardware Configuration—First Embodiment

Computer

Figure 2:
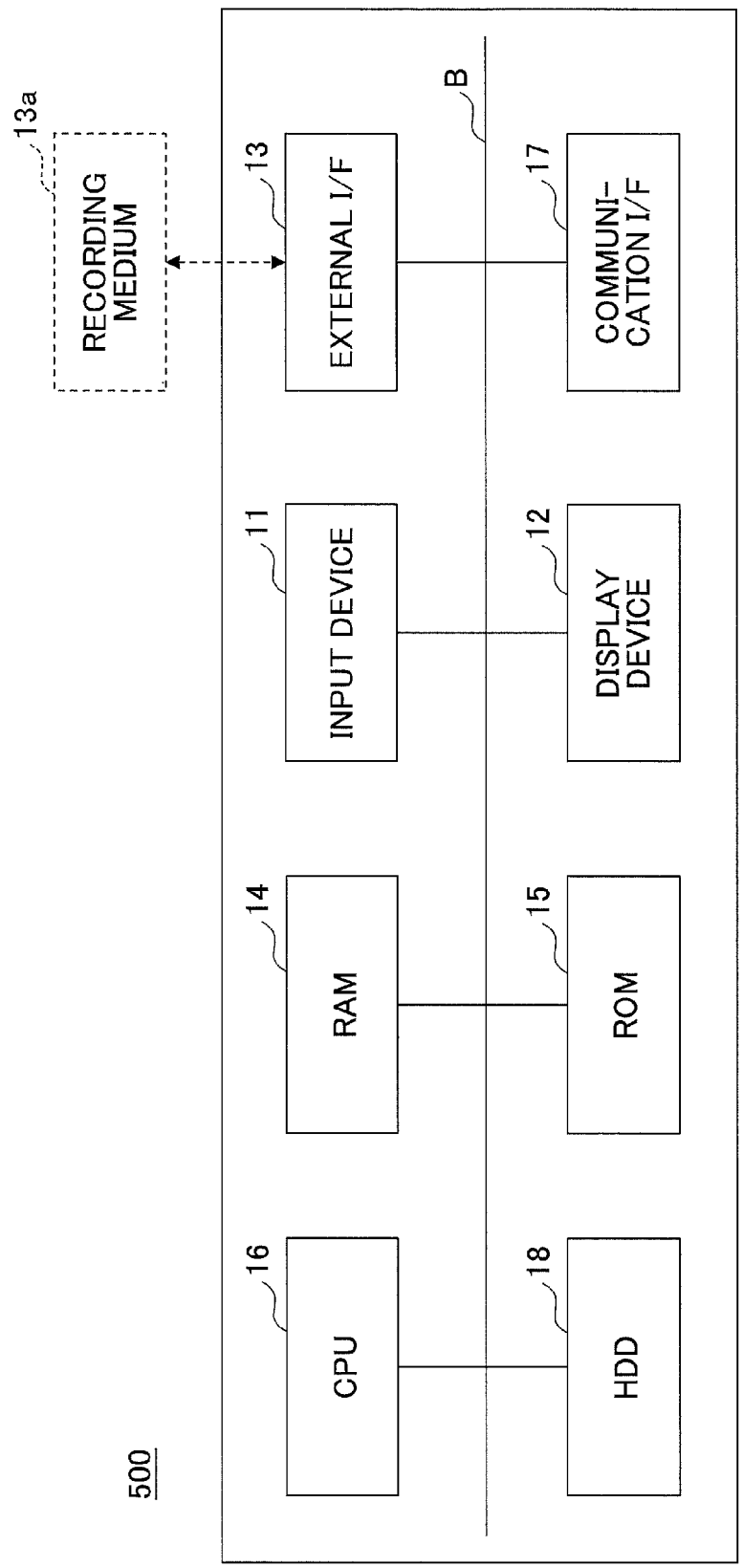
FIG. 2 is a block diagram illustrating an example of a hardware configuration of an example of a computer according to the first embodiment of the present invention.

The one or more information processing apparatuses realizing the service providing system 10 illustrated in FIG. 1 are realized by a computer having a hardware configuration as illustrated in FIG. 2. Furthermore, the terminal device 30 illustrated in FIG. 1 is also realized by a computer having a hardware configuration as illustrated in FIG. 2. FIG. 2 is a block diagram illustrating an example of a hardware configuration of an example of a computer according to the first embodiment of the present invention.

A computer 500 illustrated in FIG. 2 includes an input device 11, a display device 12, an external interface (I/F) 13, a Random Access Memory (RAM) 14, a Read-Only Memory (ROM) 15, a Central Processing Unit (CPU) 16, a communication I/F 17, and a Hard Disk Drive (HDD) 18. These hardware elements are interconnected by a bus B.

The input device 11 includes a keyboard, a mouse, and a touch panel, and is used by the user for inputting various operation signals. The display device 12 includes a display, etc., and displays processing results obtained by the computer 500. Note that the input device 11 and the display device 12 may have a configuration of being connected and used when necessary.

The communication I/F 17 is an interface that connects the computer 500 to the network N1. Accordingly, the computer 500 is able to perform data communication via the communication I/F 17. The HDD 18 is an example of a non-volatile storage device for storing programs and data. Examples of the stored programs and data include an OS that is the basic software for controlling the entire computer 500, and application software for providing various functions in the OS.

Note that the computer 500 may use a drive device (for example, a solid state drive (SSD)) using a flash memory as the storage medium, instead of the HDD 18. The HDD 18 manages the stored programs and data by a predetermined file system and/or a database (DB).

The external I/F 13 is an interface between the computer 500 and an external device. An example of the external device is a recording medium 13a. Accordingly, the computer 500 is able to read and/or write in the recording medium 13a via the external I/F 13. Examples of the recording medium 13a are a flexible disk, a Compact Disc (CD), a Digital Versatile Disc (DVD), a Secure Digital (SD) memory card, and a Universal Serial Bus (USB) memory.

The ROM 15 is a non-volatile semiconductor memory (storage device) that can store programs and data even after the power is turned off. The ROM 15 stores programs and data such as a Basic Input/Output System (BIOS) that is executed when the computer 500 is activated, OS settings, and network settings, etc. The RAM 14 is a volatile semiconductor memory (storage device) for temporarily storing programs and data.

The CPU 16 is an arithmetic device for controlling the entire computer 500 and realizing functions of the computer 500, by loading the programs and data from the storage devices such as the ROM 15 and the HDD 18, into the RAM 14, and executing processes.

The one or more information processing apparatuses realizing the service providing system 10 are able to realize various processes described below, by the hardware configuration of the computer 500. Furthermore, the terminal device 30 is able to realize various processes described below, by the hardware configuration of the computer 500.

<<Image Forming Apparatus>>

Figure 3:
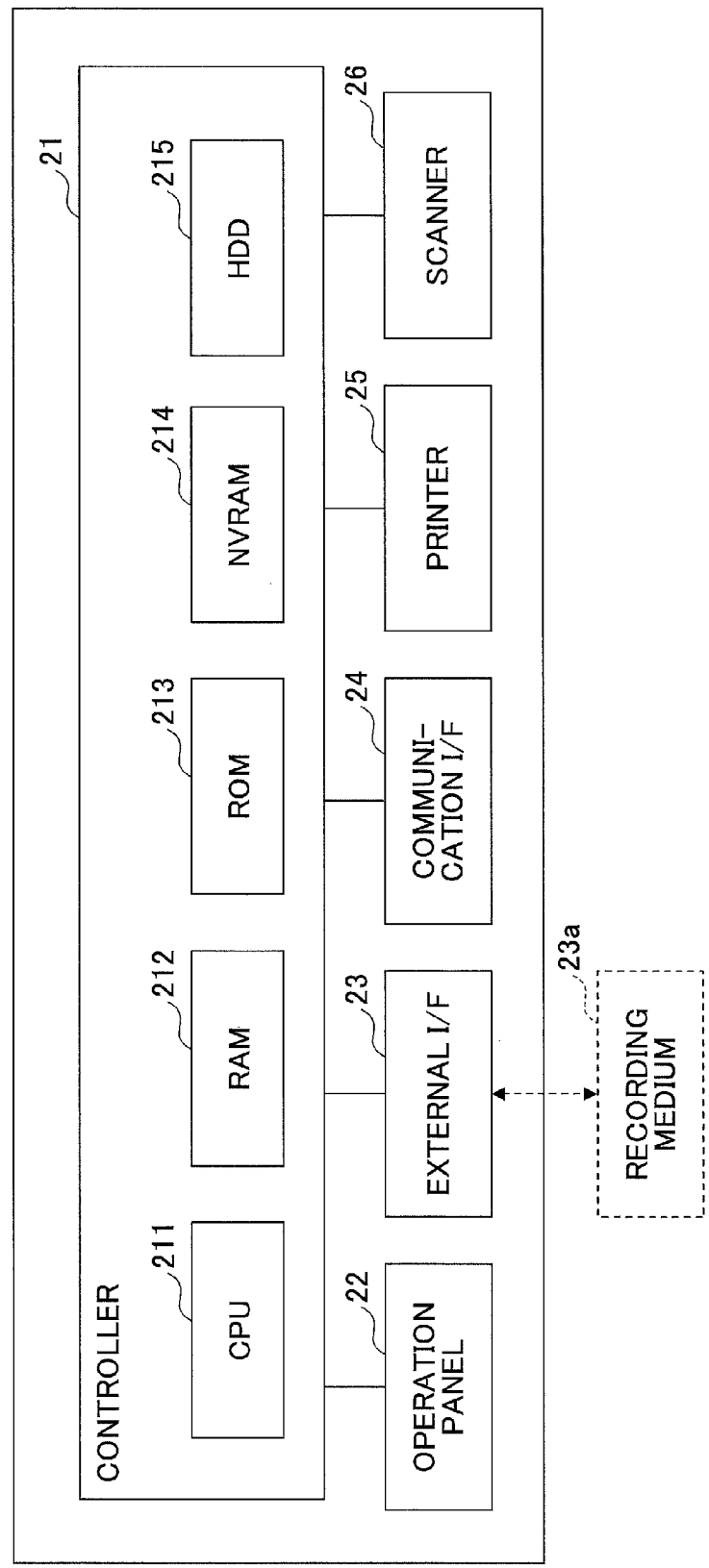
FIG. 3 is a block diagram illustrating an example of a hardware configuration of an image forming apparatus according to the first embodiment of the present invention.

The image forming apparatus 20 illustrated in FIG. 1 has a hardware configuration, for example, as illustrated in FIG. 3. FIG. 3 is a block diagram illustrating an example of a hardware configuration of the image forming apparatus 20 according to the first embodiment of the present invention. The image forming apparatus 20 illustrated in FIG. 3 includes a controller 21, an operation panel 22, an external I/F 23, a communication I/F 24, a printer 25, and a scanner 26.

The controller 21 includes a CPU 211, a RAM 212, a ROM 213, a non-volatile random access memory (NVRAM) 214, and a HDD 215. The ROM 213 stores various programs and data. The RAM 212 temporarily stores programs and data. The NVRAM 214 stores, for example, setting information. Furthermore, the HDD 215 stores various programs and data.

The CPU 211 controls the entire image forming apparatus 20 and realizes functions of the image forming apparatus 20, by loading the programs, the data, and setting information from the ROM 213, the NVRAM 214, and the HDD 215, into the RAM 212, and executing processes.

The operation panel 22 includes an input unit for accepting input from a user, and a display unit for displaying information. The external I/F 23 is an interface between the image forming apparatus 20 and an external device. An example of the external device is a recording medium 23a. Accordingly, the image forming apparatus 20 is able to read and/or write in the recording medium 23a via the external I/F 23. Examples of the recording medium 23a are an integrated circuit (IC) card, a flexible disk, a CD, a DVD, an SD memory card, and a USB memory.

The communication I/F 24 is an interface that connects the image forming apparatus 20 to the network N2. Accordingly, the image forming apparatus 20 is able to perform data communication via the communication I/F 24.

The printer 25 is a printing device for printing print data onto a conveyed object. Examples of a conveyed object are paper, a coat sheet, cardboard, an Over Head Projector (OHP) film, a plastic film, prepreg, and copper foil, etc., and the conveyed object is not limited to paper. Furthermore, the scanner 26 is a reading device for reading image data (electronic data) from an original document, and generating an image file (electronic file).

The image forming apparatus 20 according to the first embodiment is able to realize various processes described below, by the hardware configuration described above.

Software Configuration—First Embodiment

Figure 4:
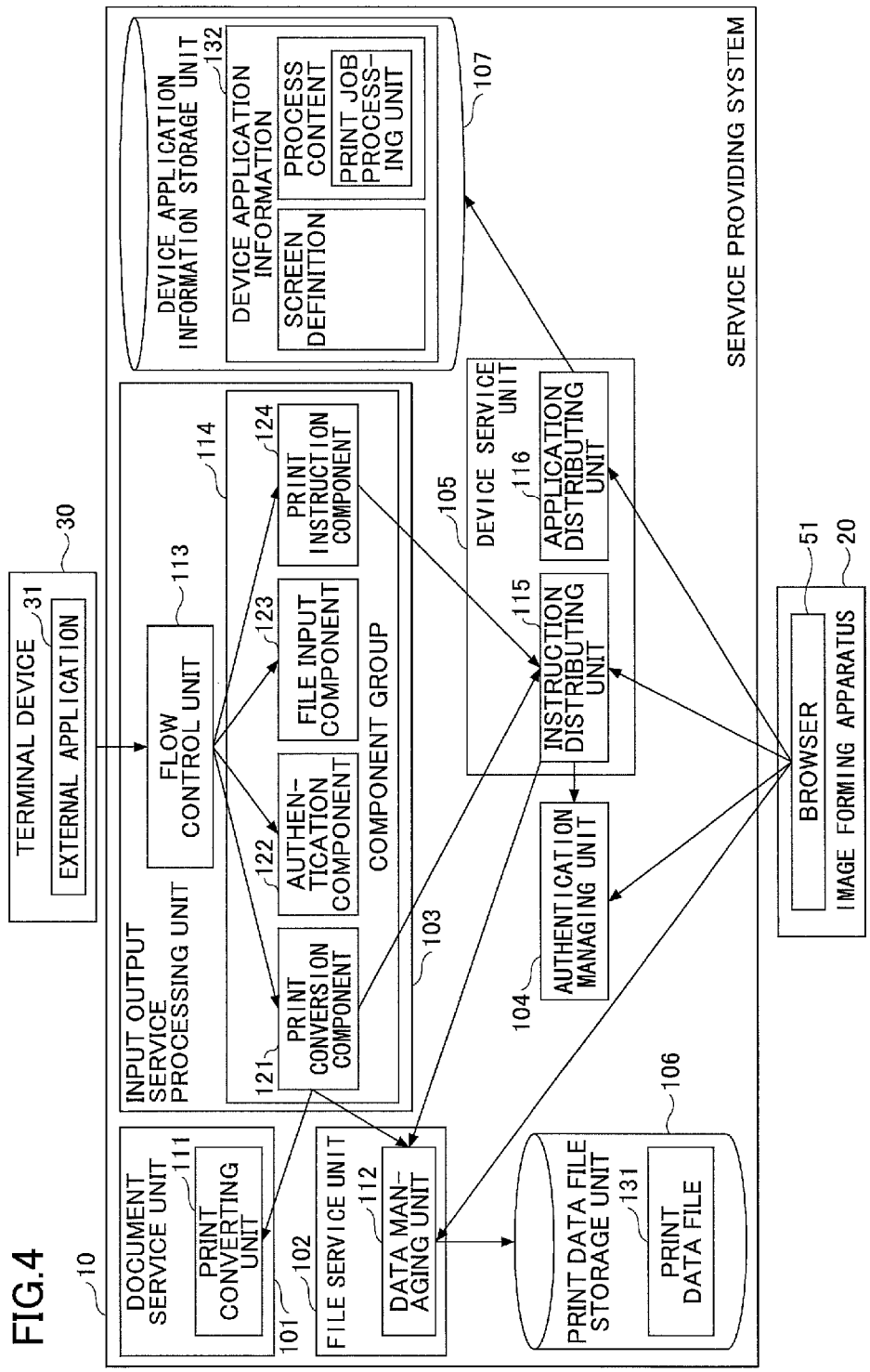
FIG. 4 is a process block diagram of an example of the information processing system according to the first embodiment of the present invention.

The information processing system 1 according to the first embodiment may be realized by process blocks, for example, as illustrated in FIG. 4. FIG. 4 is a process block diagram of an example of the information processing system 1 according to the first embodiment of the present invention.

In the image forming apparatus 20, a browser 51 is installed. The user of the image forming apparatus 20 is able to use a service provided by the service providing system 10 via the browser 51. The present embodiment is realized as long as the image forming apparatus 20 according to the first embodiment has the browser 51 installed as described above. The browser 51 is able to display, for example, web contents acquired from the service providing system 10.

The service providing system 10 includes a document service unit 101, a file service unit 102, an input output service processing unit 103, an authentication managing unit 104, a device service unit 105, a print data file storage unit 106, and a device application information storage unit 107. Note that the print data file storage unit 106 and the device application information storage unit 107 may be realized by a storage device, etc., connected to the service providing system 10 via a network.

The document service unit 101 is a group of programs (modules) for realizing services provided by the service providing system 10. The document service unit 101 includes a print converting unit 111 for converting, for example, documents of various formats into a data format that is interpretable by the image forming apparatus 20. Note that the document service unit 101 may include programs for executing various kinds of processes such as a program for compressing and decompressing an electronic file and a program for executing an optical character recognition (OCR) process on the electronic file, other than the print converting unit 111. The file service unit 102 includes a data managing unit 112. The data managing unit 112 performs access management for files used from outside.

The input output service processing unit 103 includes a flow control unit 113 and a component group 114. The flow control unit 113 executes, in conjunction with each other, a plurality of components having functions of inputting, outputting, and converting with respect to a document, to realize a document workflow. Here, a component is a module, etc., for executing various processes, and is defined by, for example, classes and functions. The flow control unit 113 provides, to an external application 31 described below, an application programming interface (API) by which conjunction of components and parameters may be specified.

The component group 114 is an assembly of components. The component group 114 includes a print conversion component 121, an authentication component 122, a file input component 123, and a print instruction component 124. Other examples of components are a scan instruction component and a fax instruction component. When the image forming apparatus 20 is a projection device, a projection conversion component and a projection instruction component may be included.

The print conversion component 121 uses the print converting unit 111 of the document service unit 101 to convert an electronic file into print data in a format that can be printed. The authentication component 122 authenticates a service. The authentication component 122 authenticates the service providing system 10, and also performs substitute authentication of an external service when using an external service.

The file input component 123 directly accepts input of a file from the external application 31 described below. Note that the file input component 123 may be a component that specifies a file in an external file storage service and accepts the specified file as input. The print instruction component 124 inputs a print instruction described in a predetermined file, including the location of the file that is a print target, in an instruction distributing unit 115 described below.

The authentication managing unit 104 performs authentication management of a user account. Furthermore, the authentication managing unit 104 issues and verifies a temporary code used for executing printing without user login. Information other than a temporary code may be used, such as a Personal Identification Number (PIN) code, a pass code, and a password. The device service unit 105 includes the instruction distributing unit 115 and an application distributing unit 116.

The instruction distributing unit 115 queues the print instructions input from the print instruction component 124, and sends a print instruction to the image forming apparatus 20 in response to a request from the image forming apparatus 20.

The application distributing unit 116 distributes the web content of device application information 132 that is displayed and executed by the browser 51 of the image forming apparatus 20. For example, the application distributing unit 116 returns a screen based on a screen definition included in the device application information 132, in response to a request from the browser 51. Accordingly, in the browser 51 of the image forming apparatus 20, a screen for using a service provided by the service providing system 10 is displayed.

The print data file storage unit 106 stores a print data file 131. The device application information storage unit 107 stores the device application information 132. In the device application information 132, a definition of a screen layout described in HyperText Markup Language (HTML) or Cascading Style Sheet (CSS), etc., and a process content indicating an example of a process for realizing a service, are described. The process content of the device application information 132 includes a print job processing unit. The print job processing unit gives a print instruction and executes a print job.

In the terminal device 30, the external application 31 is installed. The external application 31 uses the API of the input output service processing unit 103 and requests the service providing system 10 to print a document.

Process Details—First Embodiment

Next, a description is given of details of processes by the information processing system 1 according to the first embodiment.

<<Print Instruction Input>>

In order to perform printing by the information processing system 1 according to the first embodiment, a work flow including a print instruction is executed from the external application 31 of the terminal device 30, and a print instruction is input to the service providing system 10. Subsequently, in the information processing system 1, the image forming apparatus 20 acquires the print instruction from the service providing system 10 and executes printing.

FIG. 5 is a sequence diagram illustrating an example of a print instruction input process according to the first embodiment of the present invention. In step S11, the external application 31 inputs a job execution request illustrated in FIG. 6, to the service providing system 10. FIG. 6 is a configuration diagram illustrating an example of a job execution request input to the service providing system 10 according to the first embodiment of the present invention.

The job execution request of FIG. 6 is sent in a format of multipart/form data, in order to simultaneously send flow settings, parameters, and the file that is the print target. In the job execution request of FIG. 6, flow settings and parameters in the JavaScript Object Notation (JSON) format are described in the first part, and data of the file is described in the next part. Note that in the case of a job execution request that does not include a file, the flow settings and the parameters may be sent in the format of application/json.

The flow settings in the job execution request of FIG. 6 are expressed as an arrangement of objects having the fields of component, params, and next. Component is the name of the component. The name of the print conversion component 121 is "print_convert" in the job execution request of FIG. 6. The name of the authentication component 122 is "auth" in the job execution request of FIG. 6.

The name of the file input component 123 is "file_input" in the job execution request of FIG. 6. The name of the print instruction component 124 is "print_command" in the job execution request of FIG. 6.

Params is the parameter setting with respect to a component, and differs according to the component. For example, as the parameters with respect to the authentication component 122 in FIG. 6, a user name (username) and a password (password) used for user login are set. Furthermore, as the parameters with respect to the file input component 123 in FIG. 6, a file name (name) is set. Furthermore, as the parameters with respect to the print conversion component 121 in FIG. 6, a page description language (PDL) type and the parameters of print settings are set.

The PDL type (pdl) indicates the type of the print data format. Furthermore, the parameters of print settings include the number of copies (copies), a color/monochrome setting (colormode), a sheet size (papersize), a double-sided setting (2 sided), and a combined setting (layout).

Furthermore, as the parameters with respect to the print instruction component 124 in FIG. 6, a description (description) of a print instruction displayed on the browser 51 of the image forming apparatus 20 and the time and date when the job execution request is input (created_at), are set.

Next is the name of the component to be processed next. The processing result is passed to the component to be processed next. That is, the parameters specified by the job execution request when executing a process, and the processing result of the component that has performed a process previously, are passed to each component.

For example, when a flow based on the job execution request of FIG. 6 is executed, the data flow between the respective components is as illustrated in FIG. 7, for example. FIG. 7 is a diagram illustrating an example of a data flow between the respective components according to the first embodiment of the present invention.

The flow control unit 113 refers to next in the flow setting of the job execution request of FIG. 6 to construct the dependency relationship between the components. Then, the flow control unit 113 passes on the parameter settings of the job execution request and the processing result of the component that has performed the process previously, and sequentially executes the components.

Note that as illustrated in FIG. 7, components that do not have a dependency relationship may be executed in parallel. In the example of FIG. 7, the authentication component 122 is executed in parallel with the file input component 123 and the print conversion component 121. Even if the components do not have a dependency relationship, the components do not have to be executed in parallel.

In the case of the job execution request of FIG. 6, for example, as illustrated in the sequence diagram of FIG. 5, the flow control unit 113 sequentially executes the authentication component 122, the file input component 123, the print conversion component 121, and the print instruction component 124, in the stated order.

Referring back to FIG. 5, the flow control unit 113 reads the user name and the password used for user login in the parameter settings of the authentication component 122 described in the job execution request of FIG. 6. Then, in step S12, the flow control unit 113 passes the user name and the password used for user login to the authentication component 122, and instructs execution.

In step S13, the authentication component 122 specifies the user name and the password used for user login, and requests the authentication managing unit 104 to perform user authentication. When the authentication is successful, the authentication managing unit 104 returns authentication information to the authentication component 122. Note that the authentication information includes a user name and an authentication token. Then, the authentication information is returned to the flow control unit 113 from the authentication component 122.

The flow control unit 113 reads the file that is a print target from the job execution request, based on the file name in the parameter settings in the file input component 123 described in the job execution request of FIG. 6. Then, in step S14, the flow control unit 113 passes the file that is the print target to the file input component 123, and instructs execution. Then, in step S15, the file input component 123 temporarily stores the received file, and returns the file path of the storage location to the flow control unit 113.

Next, the flow control unit 113 reads the PDL type and the print settings in the parameter settings of the print conversion component 121 described in the job execution request of FIG. 6. In step S16, the flow control unit 113 passes, to the print conversion component 121, the PDL type and the print settings in the parameter settings of the print conversion component 121, and the file path that is the processing result of the file input component 123, and instructs execution.

In step S17, the print conversion component 121 passes, to the print converting unit 111, the PDL type and the print settings in the parameter settings of the print conversion component 121, and the file path that is the processing result of the file input component 123, and instructs conversion.

In step S18, the print converting unit 111 uses the file path to acquire the file that is temporarily stored. Then, the print converting unit 111 converts the acquired file into print data based on the print settings. In step S19, the print converting unit 111 temporarily stores the converted print data. In step S20, the print converting unit 111 returns the file path of the print data and the PDL type to the flow control unit 113.

Next, the flow control unit 113 reads the parameter settings in the print instruction component 124 described in the job execution request of FIG. 6. In step S21, the flow control unit 113 passes, to the print instruction component 124, the parameter settings that have been read, the processing result of the authentication component 122, and the processing result of the print conversion component 121, and instructs execution. Note that the processing result of the authentication component 122 is authentication information. The processing result of the print conversion component 121 is the file path of the print data and the PDL type.

In step S22, the print instruction component 124 specifies the authentication information and the file path of the print data passed from the flow control unit 113, and instructs the data managing unit 112 to store the print data. The data managing unit 112 issues a storage destination URL indicating the storage location of the print data and returns the issued storage destination URL to the print instruction component 124. Accordingly, in the information processing system 1 according to the first embodiment, the print data can be accessed by the user's authority from outside the service providing system 10.

In step S23, the print instruction component 124 uses the authentication managing unit 104 to issue a temporary code. The timing of issuing a temporary code is not limited to step S23. The temporary code is used when executing printing by inputting a temporary code instead of by user login from the image forming apparatus 20. Note that, for example, the temporary code cannot be used anymore after a predetermined time passes.

In step S24, the print instruction component 124 specifies the temporary code, the authentication information, and the print instruction data illustrated in FIG. 8, and instructs the instruction distributing unit 115 to issue a print instruction. FIG. 8 is a configuration diagram illustrating an example of print instruction data registered in the instruction distributing unit 115 according to the first embodiment of the present invention.

Description and created_at are included in the parameter settings of the print instruction component 124. Pdl is included in the processing result of the print conversion component 121. Fileurl is the storage destination URL. Type is information added for indicating that the data is a print instruction.

The instruction distributing unit 115 queues the received print instruction data, and returns the print instruction data to the image forming apparatus 20 in response to a request from the image forming apparatus 20. The instruction distributing unit 115 processes and stores the received print instruction data as illustrated in FIG. 9. FIG. 9 is a configuration diagram illustrating an example of the processed print instruction data according to the first embodiment of the present invention.

Id is an example of identification information for uniquely identifying an instruction. Updated_at is the time and date when the state of the print instruction has been changed the last time. The initial value of updated_at is the same as the initial value of created_at. Status is the state of the print instruction. The initial value of status is created. The subsequent changes in the state of the print instruction in status are described below.

Figure 10:
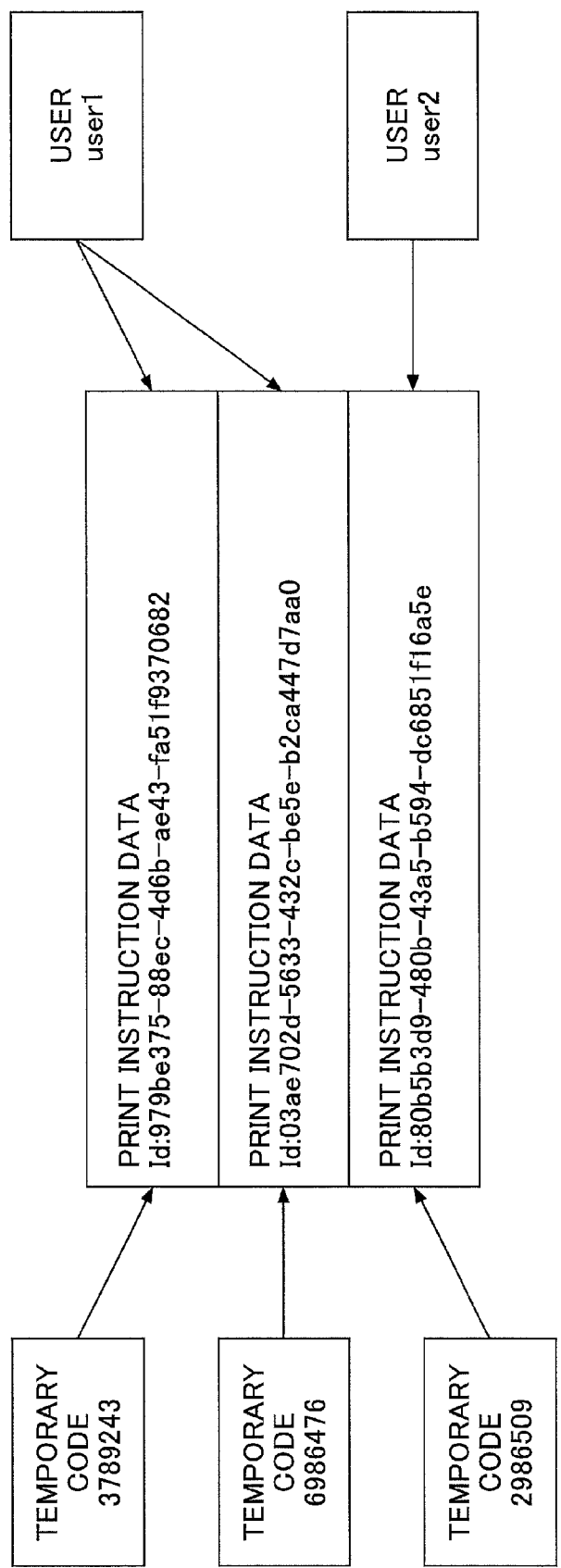
FIG. 10 is a diagram for describing an example of a storage format of print instruction data according to the first embodiment of the present invention.

Note that the instruction distributing unit 115 manages the processed print instruction data in association with the authentication information and the temporary code as illustrated in FIG. 10. FIG. 10 is a diagram for describing an example of the storage format of the print instruction data according to the first embodiment of the present invention. As illustrated in FIG. 10, each print instruction data item is uniquely associated with a temporary code. Furthermore, the print instruction data items are association with a user ID in a format of n to 1 ("n" print instruction data items to one user ID). By the associations illustrated in FIG. 10, the instruction distributing unit 115 is able to uniquely extract the print instruction data corresponding to a temporary code, and extract a list of print instruction data items corresponding to a user ID.

In step S25, the print instruction component 124 returns the temporary code to the flow control unit 113. When the execution of all components is completed, the flow control unit 113 returns a temporary code that is the execution result of the print instruction component 124 that is the last component, to the external application 31 of the terminal device 30. Then, in step S26, the external application 31 presents the temporary code to the user by some kind of means (for example, displaying, etc.)

Figure 11:
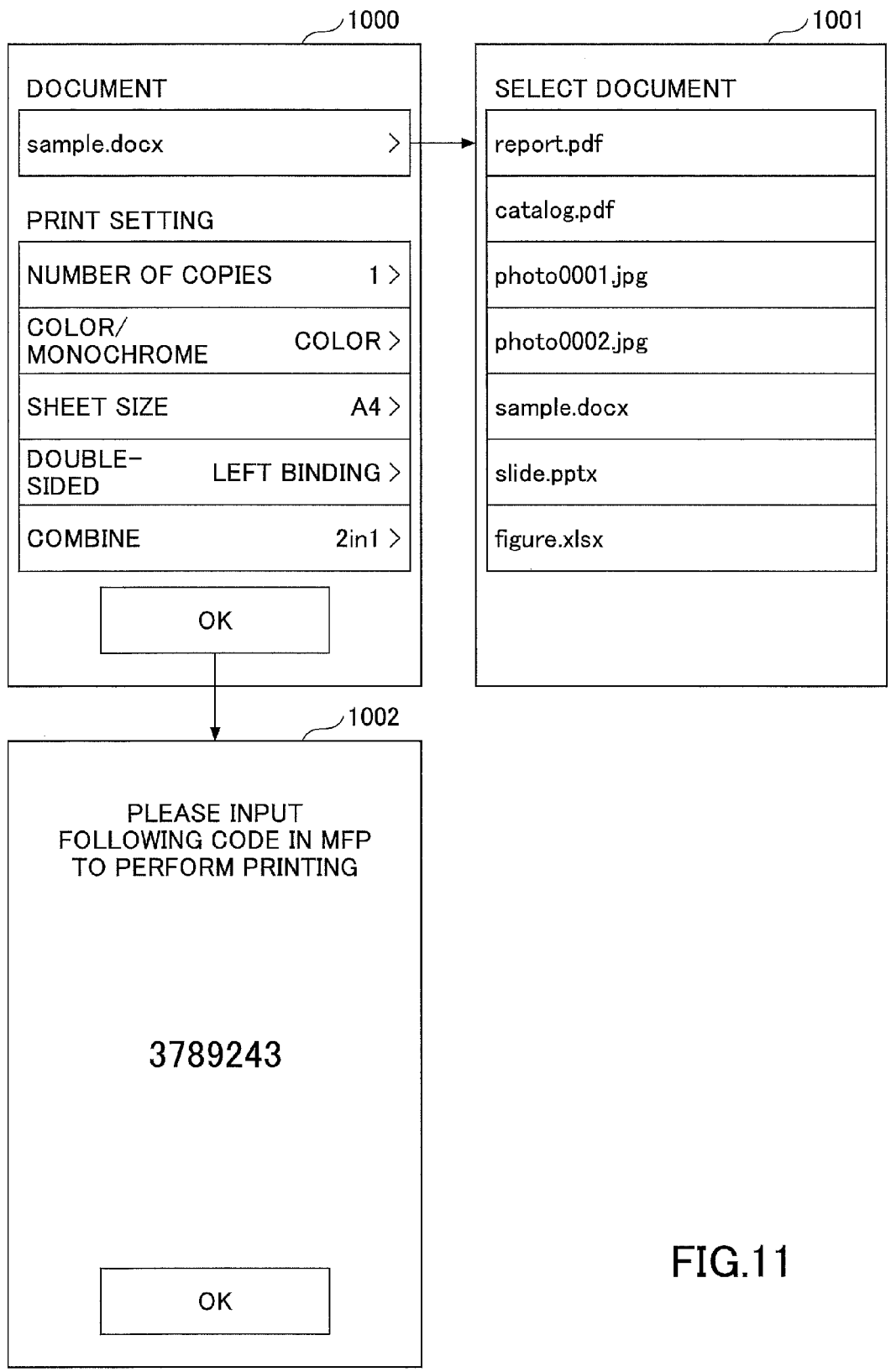
FIG. 11 is a screen transition diagram of an example of an external application according to the first embodiment of the present invention.

FIG. 11 is a screen transition diagram of an example of the external application 31 according to the first embodiment of the present invention. The user causes the screen to transition from a top screen 1000 to a document selection screen 1001, and selects a document that is the print target from the document selection screen 1001. Furthermore, the user selects a print setting from the top screen 1000. The screen of FIG. 11 is relevant to print settings. For example, in the case of a scanning operation, scan settings are displayed.

When the user presses the OK button in the top screen 1000, the external application 31 inputs the job execution request of FIG. 6 in the service providing system 10 by the process of step S11 in FIG. 5.

For example, a document selected from the document selection screen 1001 becomes a file name (name) in the parameter settings in the file input component 123. Furthermore, a print setting selected from the document selection screen 1001 becomes the print setting in the parameter settings in the print conversion component 121. When the temporary code is returned as a response to from the service providing system 10, the external application 31 displays the temporary code on a result screen 1002. In the result screen 1002, a message, which prompts the user to input the temporary code in the image forming apparatus 20 to print the document that is the print target, is displayed.

<<Print Execution>>

Figure 12:
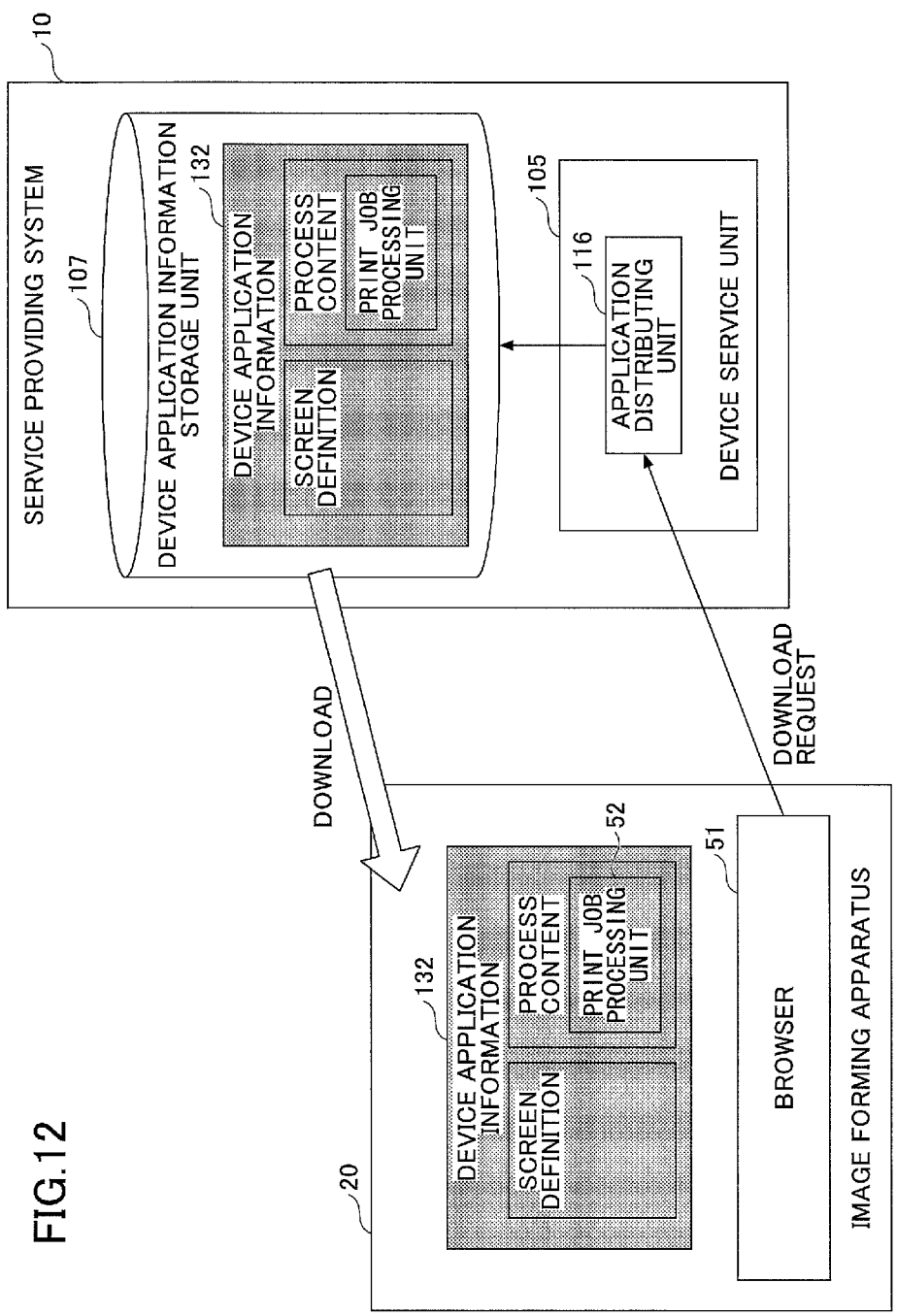
FIG. 12 is a diagram for describing content distribution from the service providing system to the image forming apparatus according to the first embodiment of the present invention.

FIG. 12 is a diagram for describing content distribution from the service providing system 10 to the image forming apparatus 20 according to the first embodiment of the present invention. The browser 51 installed in the image forming apparatus 20 stores the URL of the application distributing unit 116 of the service providing system 10 as a default URL. When the browser 51 is activated, the browser 51 sends a request to download the device application information 132, to the application distributing unit 116.

The device application information 132 includes contents such as a screen definition described in HTML or CSS and a print job processing unit in described in a script language such as Javascript (registered trademark). The downloaded device application information 132 is executed/displayed by the browser 51 of the image forming apparatus 20. Furthermore, the application distributing unit 116 of the service providing system 10 corresponds to an application cache. Therefore, the device application information 132 downloaded in the image forming apparatus 20 is not downloaded again until the device application information 132 is updated.

The information processing system 1 according to the first embodiment has a configuration in which the browser 51 of the image forming apparatus 20 downloads and displays/executes the device application information 132 disposed in the service providing system 10. Note that the information processing system 1 according to the first embodiment may have a configuration in which the device application is disposed in a local storage in the image forming apparatus 20 and the device application uses the API of each service.

Figure 13:
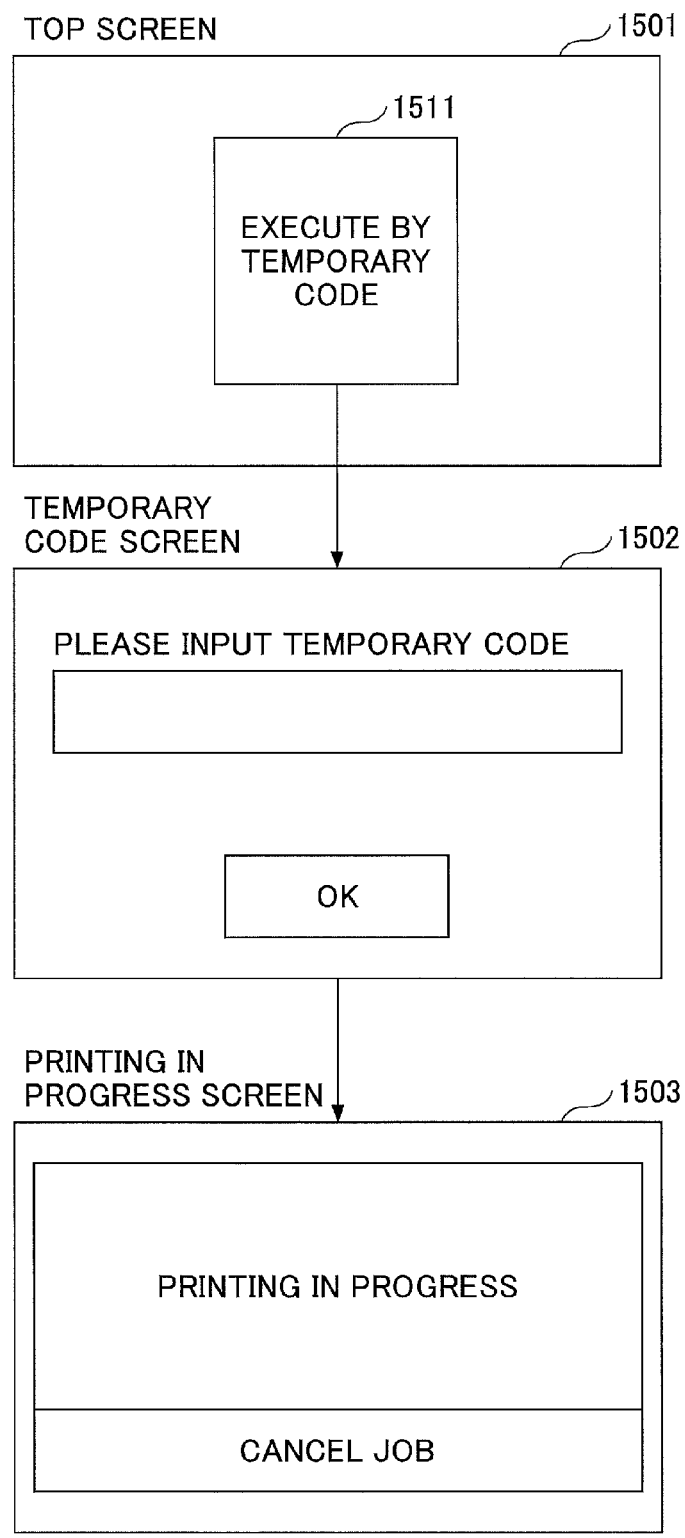
FIG. 13 is a transition diagram of an example of a user interface (UI) displayed on a browser of the image forming apparatus according to the first embodiment of the present invention.

FIG. 13 is a transition diagram of an example of a user interface (UI) displayed on the browser 51 of the image forming apparatus 20 according to the first embodiment of the present invention. The UI illustrated in FIG. 13 is displayed based on the screen definition in the device application information 132. A top screen 1501 includes a "execute by temporary code" button 1511. When the user presses the "execute by temporary code" button 1511, the browser 51 displays a temporary code screen 1502.

The temporary code screen 1502 includes a field for inputting the temporary code. The user inputs the temporary code displayed in the result screen 1002 of FIG. 11 in the temporary code screen 1502 and presses the OK button. When the temporary code is correct, the image forming apparatus 20 displays a printing in progress screen 1503, and executes printing by the procedures indicated in FIG. 14.

Figure 14:
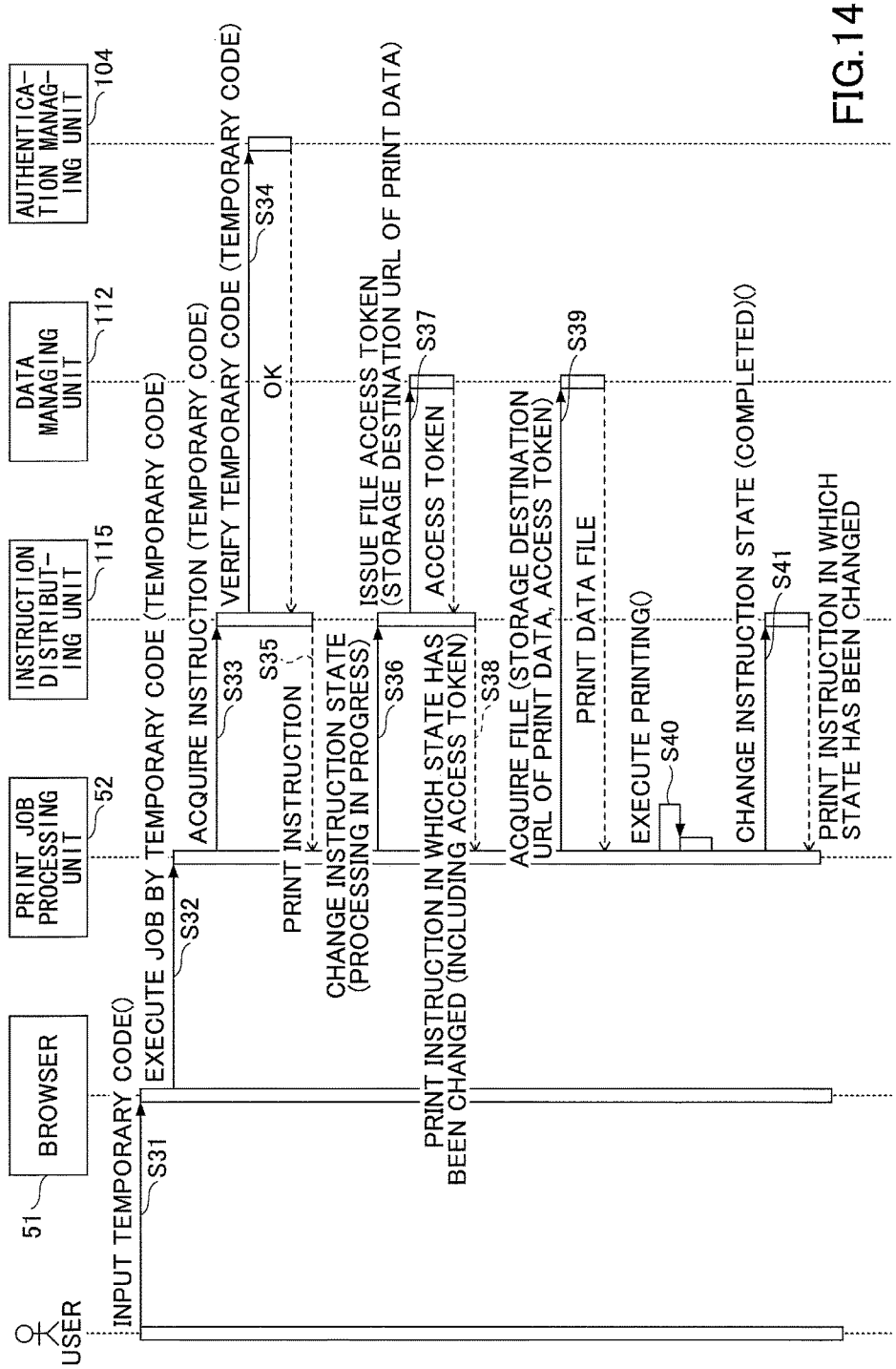
FIG. 14 is a sequence diagram of an example of print execution by inputting a temporary code according to the first embodiment of the present invention.

FIG. 14 is a sequence diagram of an example of print execution by inputting a temporary code according to the first embodiment of the present invention. In step S31, the user inputs the temporary code in the temporary code screen 1502 displayed in the browser 51, and presses the OK button.

In step S32, the browser 51 requests the print job processing unit 52 executed in the browser 51 of the image forming apparatus 20, to execute a job by the temporary code. In step S33, the print job processing unit 52 specifies the temporary code and requests the instruction distributing unit 115 of the service providing system 10 to acquire an instruction.

In step S34, the instruction distributing unit 115 requests the authentication managing unit 104 to verify whether the temporary code is valid. Here, the following description is based on the assumption that the temporary code is valid. When the temporary code is valid, in step S35, the instruction distributing unit 115 returns the print instruction data of FIG. 9 stored in association with the temporary code, to a print job processing unit 52.

The print job processing unit 52 needs to change the state of the print instruction data (status) to processing in progress (processing) as illustrated in FIG. 15, in order to start the print job. FIG. 15 is a configuration diagram illustrating an example of print instruction data in which the state has been changed to processing in progress according to the first embodiment of the present invention. In the print instruction data illustrated in FIG. 15, status is changed to processing, and updated_at is changed to the time of the corresponding time point.

In step S36, the print job processing unit 52 requests the instruction distributing unit 115 to change the instruction state to processing in progress, in order to change the state of the print instruction data to processing in progress as illustrated in FIG. 15. In step S37, the instruction distributing unit 115, which has accepted the request to change the instruction state to processing in progress, specifies the storage destination URL of the print data and requests the data managing unit 112 to issue an access token.

The access token can be used temporarily, and is needed to access the print data at the storage destination URL. Note that the access token is valid with respect to the print data at the storage destination URL, and becomes invalid after a predetermined time passes. The data managing unit 112 returns the issued access token to the instruction distributing unit 115.

In step S38, the instruction distributing unit 115 returns, to the print job processing unit 52, the print instruction data as illustrated in FIG. 16, in which the access token is included in the print instruction data as illustrated in FIG. 15 in which the state has been changed to processing in progress. FIG. 16 is a configuration diagram illustrating an example of print instruction data including an access token according to the first embodiment of the present invention. In the print instruction data of FIG. 16, an access token (accessToken) is added to the field.

In step S39, the print job processing unit 52 specifies the storage destination URL of the print data and the access token, and requests the data managing unit 112 to acquire the file. When the access token is valid, the data managing unit 112 returns the print data at the storage destination URL to the print job processing unit 52.

In step S40, the print job processing unit 52 inputs the print data in the controller 21 and executes printing. In step S41, the print job processing unit 52 requests the instruction distributing unit 115 to change the instruction state to completed, in order to change the state of the print instruction data as illustrated in FIG. 16 to completed. The instruction distributing unit 115 determines that the processing of the print instruction data has been completed, according to the request to change the instruction state to completed.

The instruction distributing unit 115, which has accepted the request to change the instruction state to completed, changes the status of the print instruction data illustrated in FIG. 16 to completed as indicated in FIG. 17, and changes updated_at to the time of the corresponding time point. The instruction distributing unit 115 returns the print instruction data as illustrated in FIG. 17 in which the state has been changed to completed, to the print job processing unit 52.

Figure 18:
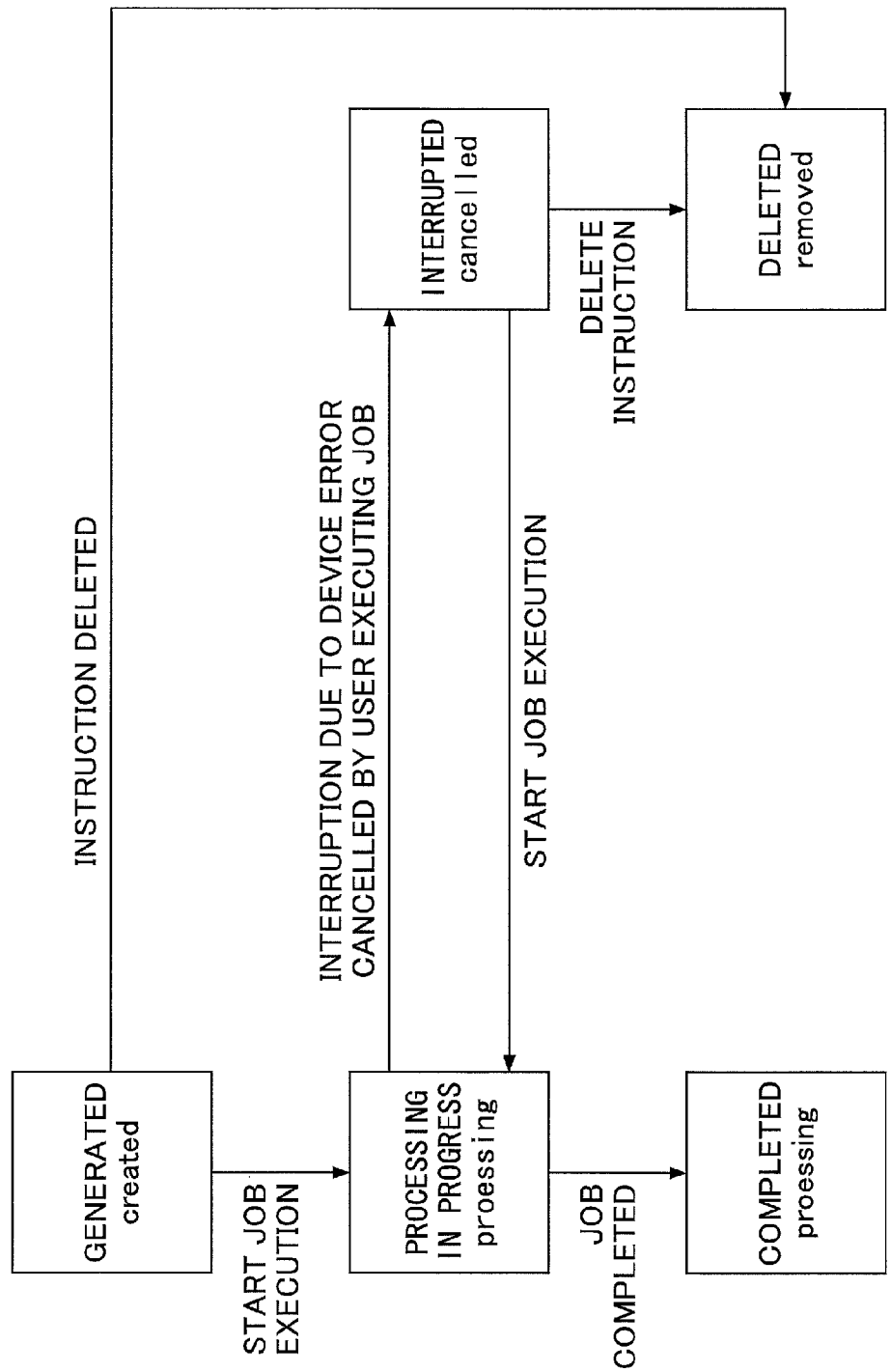
FIG. 18 is a state transition diagram of the print instruction data according to the first embodiment of the present invention.

FIG. 18 is a state transition diagram of the print instruction data according to the first embodiment of the present invention. The state of the print instruction data immediately after being input to the instruction distributing unit 115 is generation completed (created) as indicated in FIG. 9. Subsequently, the state of the print instruction data becomes job execution started, and is changed to processing in progress (processing) as indicated in the print instruction data of FIG. 15.

When the job is normally completed, the state of the print instruction data is changed to completed as in the print instruction data of FIG. 17. When the job is interrupted due to an error during job execution in the image forming apparatus 20 by which the job cannot be continued, or when the user has cancelled the job, the print job processing unit 52 changes the state of the print instruction data to interrupted (cancelled). The print instruction data whose state is interrupted may shift to processing in progress (processing) again.

Figure 19:
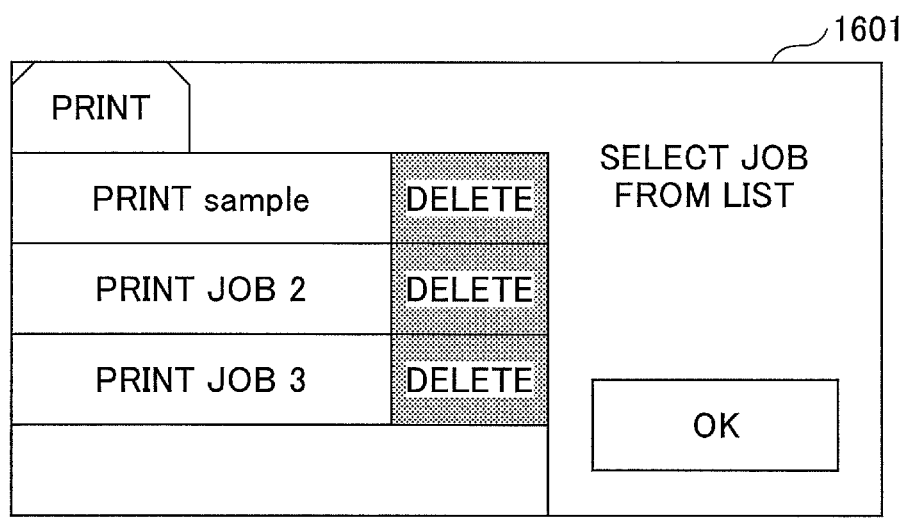
FIG. 19 is an image diagram illustrating an example of an instruction selection screen by which the print instruction data can be deleted according to the first embodiment of the present invention.

Furthermore, the print instruction data whose state is generation completed or interrupted may be deleted. For example, the deletion of the print instruction data whose state is generation completed or interrupted may be executed by providing a delete button in a list in an instruction selection screen 1601 as illustrated in FIG. 19. FIG. 19 is an image diagram illustrating an example of the instruction selection screen 1601 by which the print instruction data can be deleted according to the first embodiment of the present invention.

Note that by making a setting such that the print job processing unit 52 can acquire, from the instruction distributing unit 115, only print instruction data whose state is generation completed or interrupted, it is possible to prevent a situation that print instruction data that is already being processed is processed at the same time by another image forming apparatus 20. Furthermore, by making the setting such that the print job processing unit 52 can acquire, from the instruction distributing unit 115, only print instruction data whose state is generation completed or interrupted, it is possible to prevent a situation where print instruction data whose state is completed or already deleted is processed again. Furthermore, the state of the print instruction data may be used for managing a usage log by the service providing system 10.

Second Embodiment

In the first embodiment, the image forming apparatus 20 extracts the print instruction data from the service providing system 10 according to the temporary code. In a second embodiment, the image forming apparatus 20 extracts the print instruction data from the service providing system 10 according to login. Note that the second embodiment is the same as the first embodiment except for some parts, and therefore redundant descriptions are omitted according to need.

Figure 20:
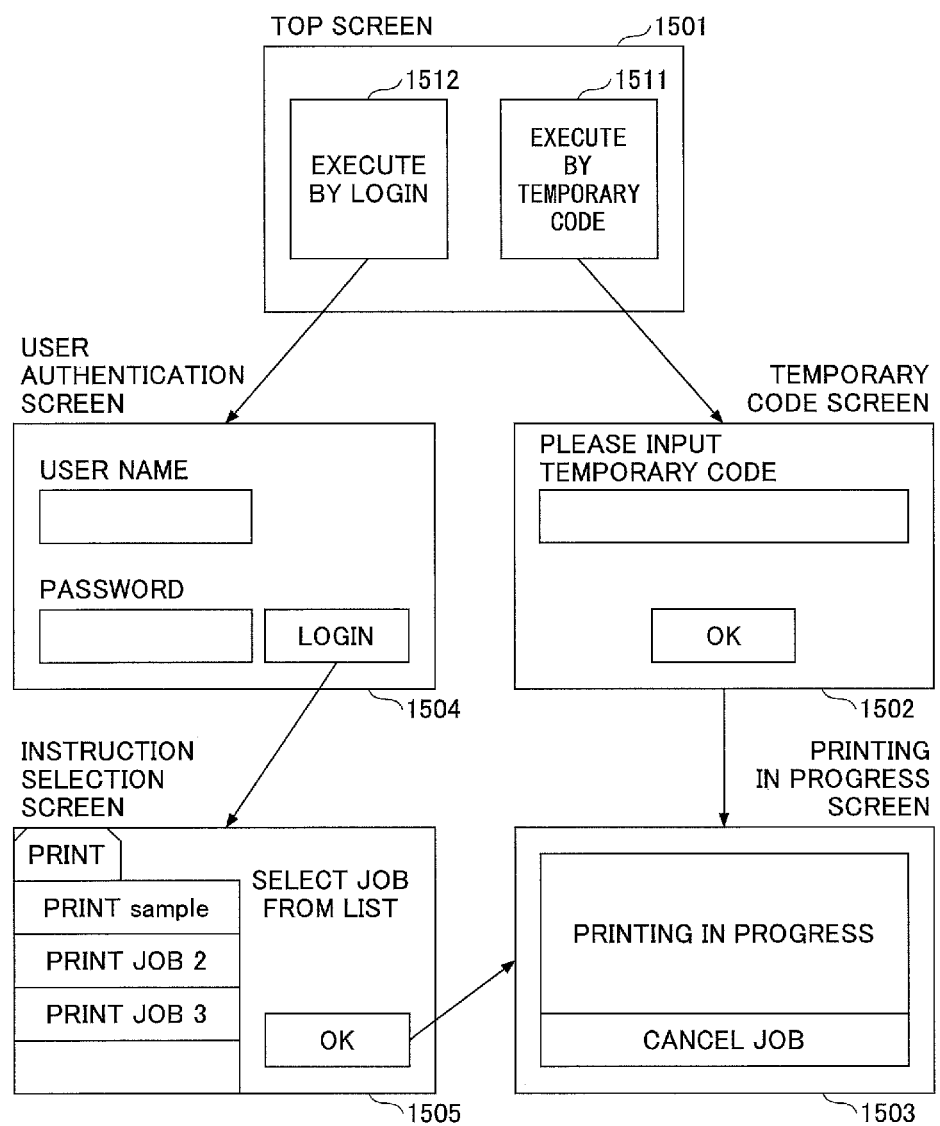
FIG. 20 is a transition diagram of another example of a UI displayed on the browser of the image forming apparatus according to a second embodiment of the present invention.

FIG. 20 is a transition diagram of another example of a UI displayed on the browser 51 of the image forming apparatus 20 according to the second embodiment of the present invention. The UI illustrated in FIG. 20 is also displayed based on the screen definition in the device application information 132. In the top screen 1501, an "execute by temporary code" button 1511 and an "execute by login" button 1512 are provided. When the user presses the "execute by temporary code" button 1511, the processes described in the first embodiment are performed.

When the user presses the "execute by login" button 1512, the browser 51 displays a user authentication screen 1504. The user authentication screen 1504 is provided with fields for inputting a user name and a password. The user inputs a user name and a password in the user authentication screen 1504 and presses a login button.

When the authentication is successful, in the image forming apparatus 20, the screen transitions to an instruction selection screen 1505. In the instruction selection screen 1505, a list of print instruction data items is displayed. The list includes the print instruction data items that are stored in the service providing system 10 in association with the user ID of the user for which the authentication has been successful. In the list of the print instruction data items displayed in the instruction selection screen 1505, descriptions of the print instructions set in description of the print instruction data items are displayed for identifying print instruction data.

The user selects print instruction data for which a job is to be executed from the list in the instruction selection screen 1505, and presses the OK button. The image forming apparatus 20 displays the printing in progress screen 1503 and executes printing according to the procedures indicated in FIG. 21.

Figure 21:
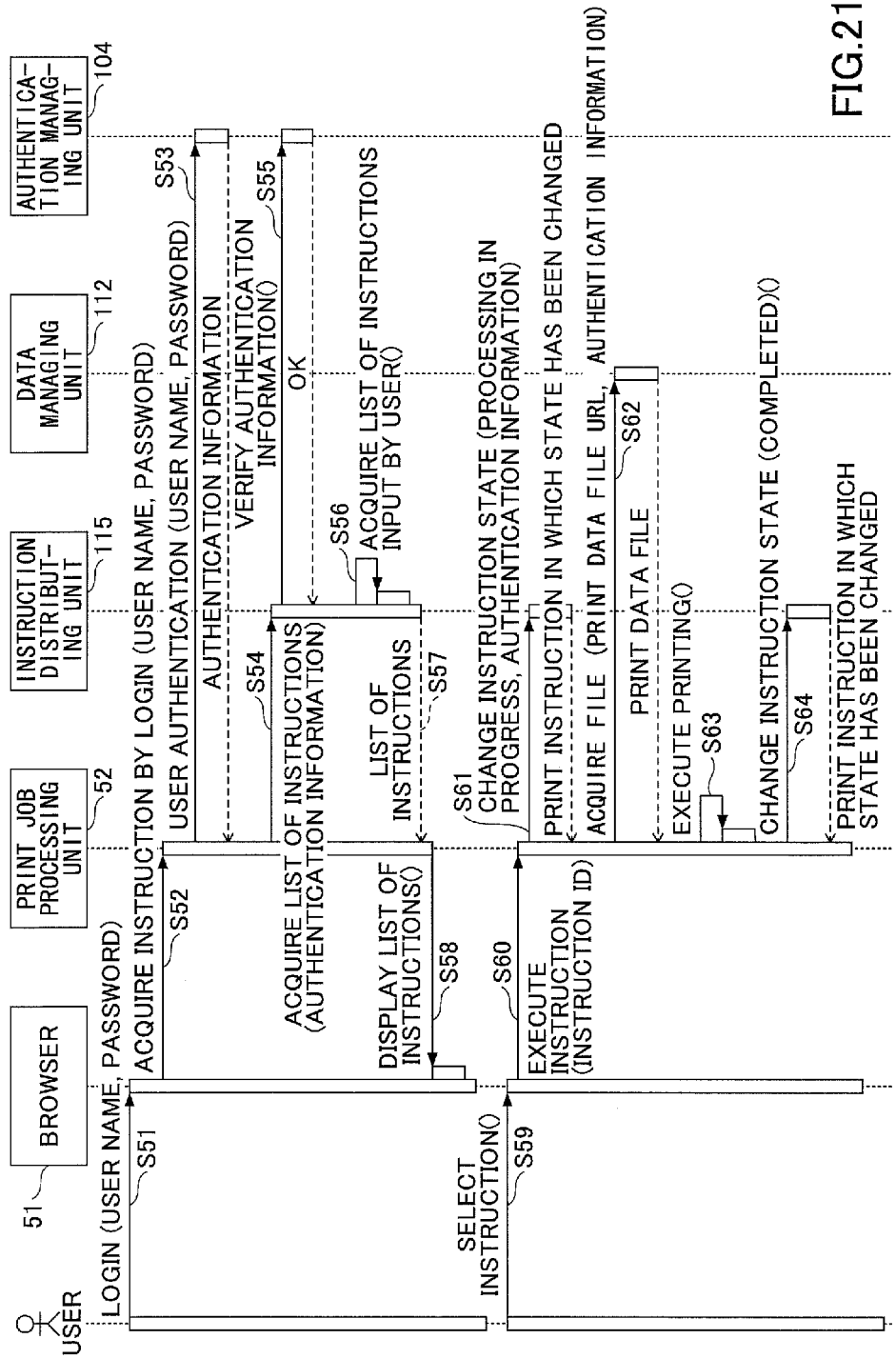
FIG. 21 is a sequence diagram illustrating an example of a print execution process according to user authentication according to the second embodiment of the present invention.

FIG. 21 is a sequence diagram illustrating an example of a print execution process according to user authentication according to the second embodiment of the present invention. In step S51, the user inputs a user name and a password in the user authentication screen 1504 of FIG. 20 displayed in the browser 51, and presses an OK button.

In step S52, the browser 51 requests the print job processing unit 52 executed in the browser 51 of the image forming apparatus 20, to perform job execution according to login. In step S53, the print job processing unit 52 requests the authentication managing unit 104 of the service providing system 10 to perform user authentication. When the user authentication is successful, the authentication managing unit 104 returns authentication information to the print job processing unit 52.

In step S54, the print job processing unit 52 specifies the authentication information and requests the instruction distributing unit 115 of the service providing system 10 to acquire an instruction list. In step S55, the instruction distributing unit 115 requests the authentication managing unit 104 to verify the authentication information. Here, the following description is based on the assumption that the verification result of the authentication information is OK.

When the authentication information is OK, the instruction distributing unit 115 proceeds to step S56, and acquires a list of print instruction data items that are stored in the service providing system 10 in association with the user ID of the user for which the authentication has been successful. In step S57, the instruction distributing unit 115 returns the acquired list of print instruction data items to the print job processing unit 52.

FIG. 22 is a configuration diagram of an example of a list of print instruction data items returned to the print job processing unit 52 from the instruction distributing unit 115 according to the second embodiment of the present invention. In the list of print instruction data items of FIG. 22, the print instruction data items input by the user from the terminal device 30 are sorted in an order starting from the print instruction data item having the newest time stamp. Note that the list of print instruction data items includes print instruction data items whose state is generation completed or interrupted.

In step S58, the print job processing unit 52 displays the list of print instruction data items in the browser 51 as in the instruction selection screen 1505, and prompts the user to select a print instruction data item from the list of print instruction data items.

In step S59, the user selects the print instruction data item for which a job is to be executed from the list in the instruction selection screen 1505, and presses the OK button. In step S60, the browser 51 specifies the id (instruction ID) of the selected print instruction data item, and requests the print job processing unit 52 to execute the instruction. The print job processing unit 52 needs to change the state (status) of the print instruction data to processing in progress (processing), in order to start the print job.

In step S61, the print job processing unit 52 requests the instruction distributing unit 115 to change the instruction state by specifying the authentication information and changing the state of the print instruction data to processing in progress. When the authentication information is specified, the instruction distributing unit 115 can make an access by the authentication information, and therefore the access token is not issued. Therefore, the print instruction data that is returned from the instruction distributing unit 115 to the print job processing unit 52 has the same format as the format illustrated in FIG. 15.

In step S62, the print job processing unit 52 specifies the storage destination URL of the print data and the authentication information, and requests the data managing unit 112 to acquire the file. Then, when the authentication information is valid, the data managing unit 112 returns the print data at the storage destination URL to the print job processing unit 52.

In step S63, the print job processing unit 52 inputs the print data in the controller 21 and executes printing. In step S64, the print job processing unit 52 requests the instruction distributing unit 115 to change the instruction state to completed, in order to change the state of the print instruction data to completed. The instruction distributing unit 115 determines that the processing of the print instruction data has been completed, according to the request to change the instruction state to completed.

The instruction distributing unit 115, which has accepted the request to change the instruction state to completed, changes the status of the print instruction data to completed, and changes updated_at to the time of the corresponding time point. The instruction distributing unit 115 returns the print instruction data in which the state has been changed to completed, to the print job processing unit 52.

Overview—First and Second Embodiments

In the information processing system 1 according to the first and second embodiments, in the service providing system 10, by which a document workflow can be formed by cooperation of components, the print instruction component 124 for issuing a print instruction to the image forming apparatus 20 is added.

The print instruction data, which is input through the API of the service providing system 10, is stored inside the service providing system 10. The image forming apparatus 20 acquires the print instruction data from the service providing system 10, and prints the print data that is the output target according to the acquired print instruction data.

Therefore, the information processing system 1 according to the first and second embodiments is capable of providing a platform of the service providing system 10, by which a service that can be output to the image forming apparatus 20 can be realized without developing the service at the image forming apparatus 20.

The information processing system 1 according to the first and second embodiments provides the service providing system 10 capable of supporting the development of a service for performing processes in cooperation with the image forming apparatus 20.

Third Embodiment

In a third embodiment, a service providing system API 301 prepared in the service providing system 10 is used for performing the flow of cloud printing. Note that the third embodiment is the same as the first and second embodiments except for some parts, and therefore redundant descriptions are omitted according to need.

Software Configuration—Third Embodiment

The information processing system 1 according to the third embodiment can be realized by the process blocks, for example, as illustrated in FIG. 23. FIG. 23 is a process block diagram of an example of the information processing system 1 according to the third embodiment of the present invention.

In the image forming apparatus 20, the browser 51 is installed. Furthermore, in the image forming apparatus 20, a device Software Development Kit (SDK) API 331 is installed. The browser 51 is able to use a scan executing unit 332, a print executing unit 333, an event detecting unit 334, and a device information storage unit 335, via the device SDK API 331. Furthermore, the browser 51 can acquire a web content from the service providing system 10 and display the acquired web content.

The service providing system 10 is a system environment for providing services such as a cloud service via the network N1. The service providing system 10 includes the file service unit 102, the input output service processing unit 103, the authentication managing unit 104, the device service unit 105, the print data file storage unit 106, the device application information storage unit 107, and the service providing system API 301.

The service providing system API 301 includes a job API 302 and an authentication API 303. The external application 31 of the terminal device 30 can use the input output service processing unit 103 via the job API 302. Furthermore, the external application 31 is able to use the authentication managing unit 104 via the authentication API 303.

The input output service processing unit 103 of FIG. 23 includes a file converting unit 311 and a command processing unit 312. The file converting unit 311 performs processes relevant to file conversion. The command processing unit 312 performs processes relevant to commands. The device service unit 105 includes the instruction distributing unit 115, the application distributing unit 116, and a usage history unit 321. The usage history unit 321 performs processes relevant to registering and acquiring usage history information. The device application information storage unit 107 stores the device application information 132. In the device application information 132, a definition of a screen layout described in HTML or CSS, etc., and a process content indicating an example of a process for realizing a service, are described. The process content of the device application information 132 includes a job processing unit, a device information transmitting unit, and a device information managing unit.

Processes Details—Third Embodiment

Next, a description is given of details of processes by the information processing system 1 according to the third embodiment.

<<Print Job Registration>>

Figure 24:
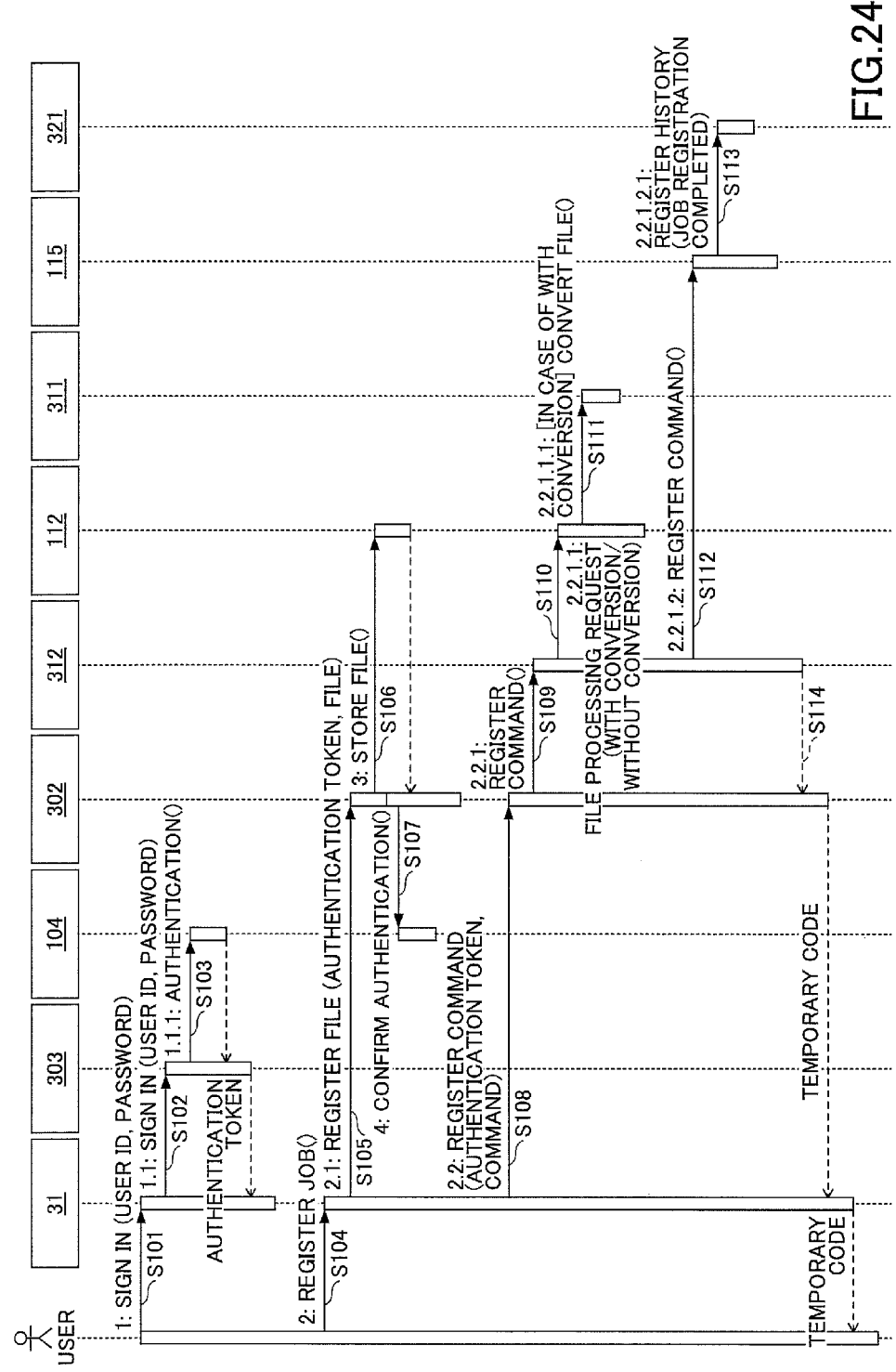
FIG. 24 is a sequence diagram illustrating an example of a print job registration process according to the third embodiment of the present invention.

FIG. 24 is a sequence diagram illustrating an example of a print job registration process according to the third embodiment of the present invention. In step S101, a user specifies a user ID and a password and requests to sign in, in the external application 31 of the terminal device 30.

In step S102, the external application 31 specifies the user ID and the password in the authentication API 303 of the service providing system API 301 prepared in the service providing system 10, and requests to sign in. In step S103, the authentication API 303 requests the authentication managing unit 104 to perform authentication. When the authentication is successful, the authentication managing unit 104 issues an authentication token and returns the authentication token to the external application 31 via the authentication API 303.

In step S104, the user requests the registration of the print job in the external application 31. In step S105, the external application 31 requests the job API 302 of the service providing system API 301 prepared in the service providing system 10, to register the file by a file registration request illustrated in FIG. 25. FIG. 25 is a configuration diagram of an example of a file registration request and a file registration response according to the third embodiment of the present invention.

In step S106, the job API 302 passes the file that is the print target to the data managing unit 112, and instructs the data managing unit 112 to store the file. The data managing unit 112 issues a storage destination URL indicating the storage location of the file that is the print target and returns the issued storage destination URL to the job API 302. Furthermore, in step S107, the job API 302 requests the authentication managing unit 104 to verify the authentication token. The authentication managing unit 104 verifies the authentication token for which verification has been requested, and when the verification result is correct, the authentication managing unit 104 returns the temporary code to the job API 302.

In step S108, the external application 31 requests the job API 302 of the service providing system API 301 prepared in the service providing system 10 to register a command by a command registration request illustrated in FIG. 26. FIG. 26 is a configuration diagram illustrating an example of a command registration request and a command registration response according to the third embodiment of the present invention.

In step S109, the job API 302 specifies the temporary code, and requests the command processing unit 312 of the input output service processing unit 103 to register the command. Processing procedures by the command processing unit 312 are described below.

In step S110, the command processing unit 312 requests the data managing unit 112 to perform file processing with conversion or without conversion. In the case of a file processing with conversion, the data managing unit 112 causes the file converting unit 311 to perform file conversion in step S111. When a file conversion process is required, the file converting unit 311 performs the process in an asynchronous manner, in order to accelerate the response of returning the temporary code.

In step S112, the command processing unit 312 specifies the temporary code and requests the instruction distributing unit 115 to register the command. The instruction distributing unit 115 stores the command in association with the temporary code. In step S113, the instruction distributing unit 115 requests the usage history unit 321 to register the history of job registration completed. The usage history unit 321 registers the usage history information of job registration completed.

Furthermore, in step S114, the command processing unit 312 returns a command registration response as illustrated in FIG. 26 including the temporary code stored in association with the command to the service providing system API 301 from the job API 302. When the command registration response as illustrated in FIG. 26 is returned, the external application 31 displays the temporary code. Therefore, the user operating the terminal device 30 is able to know the temporary code associated with the registered print job. Note that the sequence diagram of FIG. 24 indicates an example in which the user operates the external application 31; however, the user may operate a PC (including a driver), a mail, and other systems.

FIG. 30 is a flowchart of an example of processing procedures by the command processing unit 312 according to the third embodiment of the present invention. The command processing unit 312 that has accepted the request to register a command performs a process by the procedures illustrated in FIG. 30. In step S201, the command processing unit 312 determines whether "Content-Type" in the file registration request is a support target.

When "Content-Type" is not a support target, the command processing unit 312 proceeds to step S205, and returns an error response to the job API 302. When "Content-Type" is a support target, the command processing unit 312 proceeds to step S202, and determines whether "Content-Type" in the file registration request is PDL.

FIG. 31 is a diagram illustrating an example in which the "Content-Type" in the file registration request is Joint Photographic Experts Group (JPEG) and an example in which the "Content-Type" in the file registration request is PDL according to the third embodiment of the present invention. When "Content-Type" is PDL, the command processing unit 312 proceeds to step S203, and requests the data managing unit 112 to perform file processing without conversion. When "Content-Type" is not PDL, the command processing unit 312 proceeds to step S204, and requests the data managing unit 112 to perform file processing with conversion.

<<Print Job Execution>>

FIG. 27 is a sequence diagram illustrating an example of a print job execution process according to the third embodiment of the present invention. In step S121, the user inputs a temporary code in the browser 51 of the image forming apparatus 20, and instructs print job execution according to the temporary code.

In step S122, the browser 51 requests a job processing unit 341 executed in the browser 51 of the image forming apparatus 20 to execute a job according to the temporary code. In step S123, the job processing unit 341 specifies the temporary code and requests the instruction distributing unit 115 to acquire an instruction. In step S124, the instruction distributing unit 115 requests the authentication managing unit 104 to verify the temporary code. When the temporary code for which verification has been requested is correct, the authentication managing unit 104 returns permission to the instruction distributing unit 115.

The instruction distributing unit 115, which has received the returned permission, returns a command associated with the temporary code to the job processing unit 341. In step S125, the job processing unit 341 specifies processing in progress and requests the instruction distributing unit 115 to change the instruction state. In step S126, the instruction distributing unit 115, which has accepted the request to change the instruction state to processing in progress, specifies the storage destination URL of the print data and requests the data managing unit 112 to issue an access token. The data managing unit 112 returns the issued access token to the instruction distributing unit 115. In step S127, the instruction distributing unit 115 requests the usage history unit 321 to register the history of processing in progress. The usage history unit 321 changes the usage history information from job registration completed to processing in progress.

In step S128, the job processing unit 341 specifies the storage destination of the print data and the access token, and requests the data managing unit 112 to acquire a file. When the access token is valid, the data managing unit 112 returns the file of the print data at the storage destination, to the job processing unit 341.

In step S129, the job processing unit 341 uses the device SDK API 331 to execute printing of the file of the print data. In step S130, the job processing unit 341 specifies job completed and requests the instruction distributing unit 115 to change the instruction state. In step S131, the instruction distributing unit 115 requests the usage history unit 321 to register the history of job completed. Then, the usage history unit 321 changes the usage history information from processing in progress to job completed.

<<Command State Acquisition>>

FIG. 28 is a sequence diagram illustrating an example of a command state acquisition process according to the third embodiment of the present invention. In step S151, the external application 31 requests the authentication API 303 of the service providing system API 301 prepared in the service providing system 10, to perform authentication. In step S152, the authentication API 303 requests the authentication managing unit 104 to perform authentication. When the authentication is successful, the authentication managing unit 104 issues an authentication token, and returns the authentication token to the external application 31 via the authentication API 303.

In step S153, the external application 31 requests the job API 302 to acquire a command state, for example, by a command state acquisition request as illustrated in FIG. 29A. FIGS. 29A and 29B are configuration diagrams illustrating examples of a command state acquisition request and a command state acquisition response according to the third embodiment of the present invention.

In step S154, the job API 302 specifies a command ID and acquires the command state from the usage history unit 321. Furthermore, in step S155, the job API 302 requests the authentication managing unit 104 to verify the authentication token. The authentication managing unit 104 verifies the authentication token for which verification has been requested, and returns the verification result to the job API 302. When the verification result of the authentication token is correct, the job API 302 returns a command state acquired from the usage history unit 321 to the external application 31 by the command state acquisition response as illustrated in FIG. 29B.

As described above, in the information processing system 1 according to the third embodiment, the service providing system API 301 for operating the image forming apparatus 20 is prepared in the service providing system 10. The service providing system 10 cooperates with an external storage system, and may also hold contents to be displayed on the operation panel 22 of the image forming apparatus 20.

Therefore, the information processing system 1 according to the third embodiment of the present invention is capable of increasing the flexibility in the cooperation with an external storage system and increasing the developing efficiency of the external application 31 using the image forming apparatus 20. Note that in the service providing system API 301, APIs for registering a command of a job, acquiring a state, uploading a print target file, and downloading a print target file, are prepared.

An application to be installed in the image forming apparatus 20 is not developed, and therefore the information processing system 1 according to the third embodiment of the present invention is capable of developing the external application 31 using the image forming apparatus 20, without knowing the internal specifications and the operations of the image forming apparatus 20. Furthermore, by simplifying the service providing system API 301 such that the service providing system API 301 can be operated by HTML+JavaScript, the information processing system 1 according to the third embodiment of the present invention is able to facilitate the development of a Web application for operating the image forming apparatus 20. Furthermore, in the information processing system 1 according to the third embodiment of the present invention, printing can be performed by directly inputting PDL.

Fourth Embodiment

In the first through third embodiments, by the image forming apparatus 20, in which the user inputs a temporary code or logs in, the image forming apparatus 20 to perform printing is identified. In a fourth embodiment, the image forming apparatus 20 to perform printing is identified by a keyword set in file information (for example, a file name) of the file that is the print target. Note that the fourth embodiment is the same as the first through third embodiments except for some parts, and therefore redundant descriptions are omitted according to need.

System Configuration—Fourth Embodiment

Figure 32:
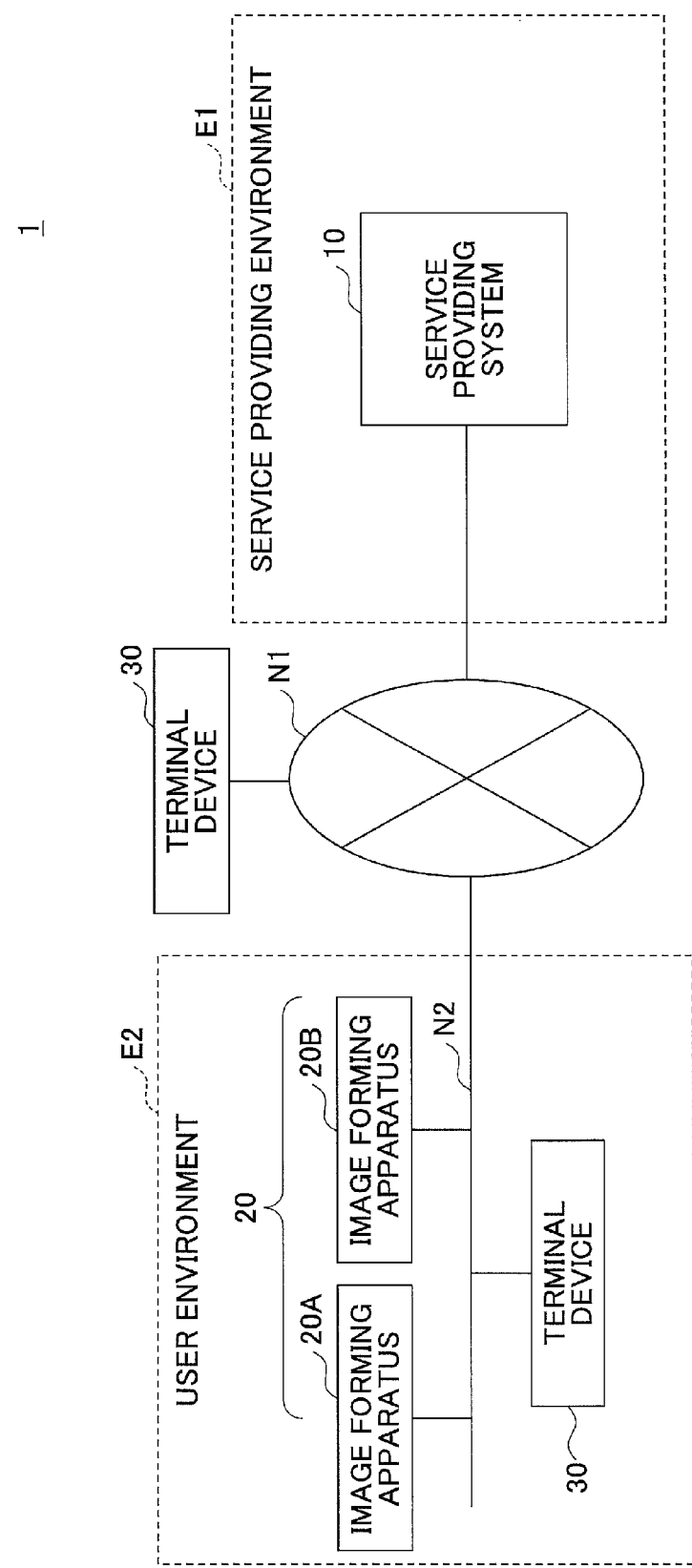
FIG. 32 is a configuration diagram illustrating an example of the information processing system according a fourth embodiment of the present invention.

FIG. 32 is a configuration diagram illustrating an example of the information processing system 1 according the fourth embodiment of the present invention. The information processing system 1 according to the fourth embodiment of the present invention. In the information processing system 1 illustrated in FIG. 32, the single image forming apparatus 20 in the information processing system 1 illustrated in FIG. 1 is replaced with two image forming apparatuses 20A and 20B. Note that the image forming apparatuses 20A and 20B are simply referred to as the image forming apparatus 20 when neither one is particularly specified. Furthermore, to the information processing system 1 of FIG. 32, an external storage system may be connected.

Software Configuration—Fourth Embodiment

Figure 33:
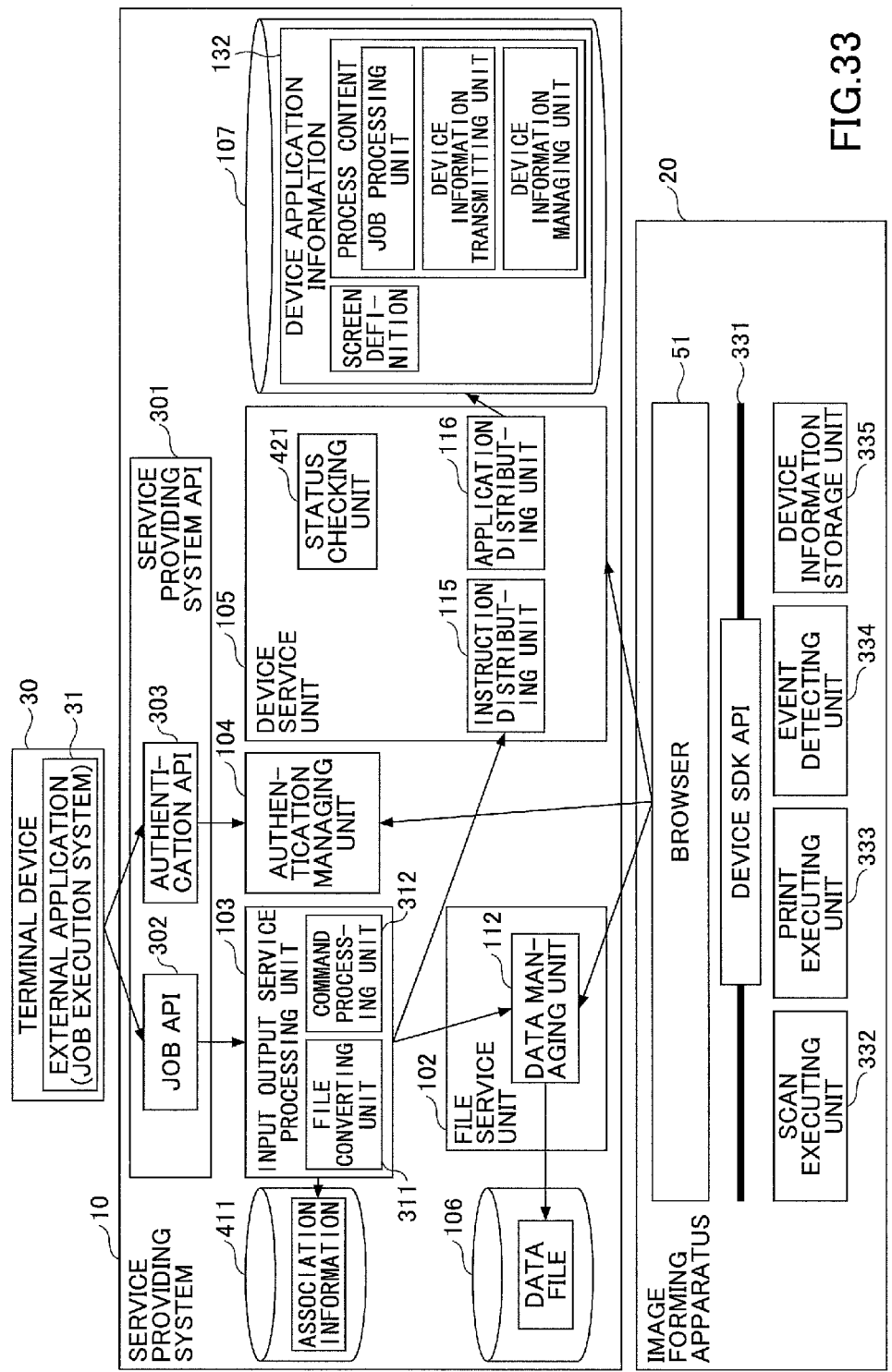
FIG. 33 is a process block diagram of an example of the information processing system according to the fourth embodiment of the present invention.

The information processing system 1 according to the fourth embodiment can be realized by the process blocks, for example, as illustrated in FIG. 33. FIG. 33 is a process block diagram of an example of the information processing system 1 according to the fourth embodiment of the present invention.

The information processing system 1 illustrated in FIG. 33 is formed by adding an association information storage unit 411 and a status checking unit 421 to the information processing system 1 illustrated in FIG. 23. The association information storage unit 411 stores association information. The association information is information for associating a keyword with the image forming apparatus 20. Note that details of the association information are described below. Furthermore, the status checking unit 421 gives a status check request to ask the image forming apparatus 20 whether the image forming apparatus 20 is in a state of being able to perform printing.

Processes Details—Fourth Embodiment

Next, a description is given of details of processes by the information processing system 1 according to the fourth embodiment.
<<Registration and Execution of Print Job>>

Figure 34:
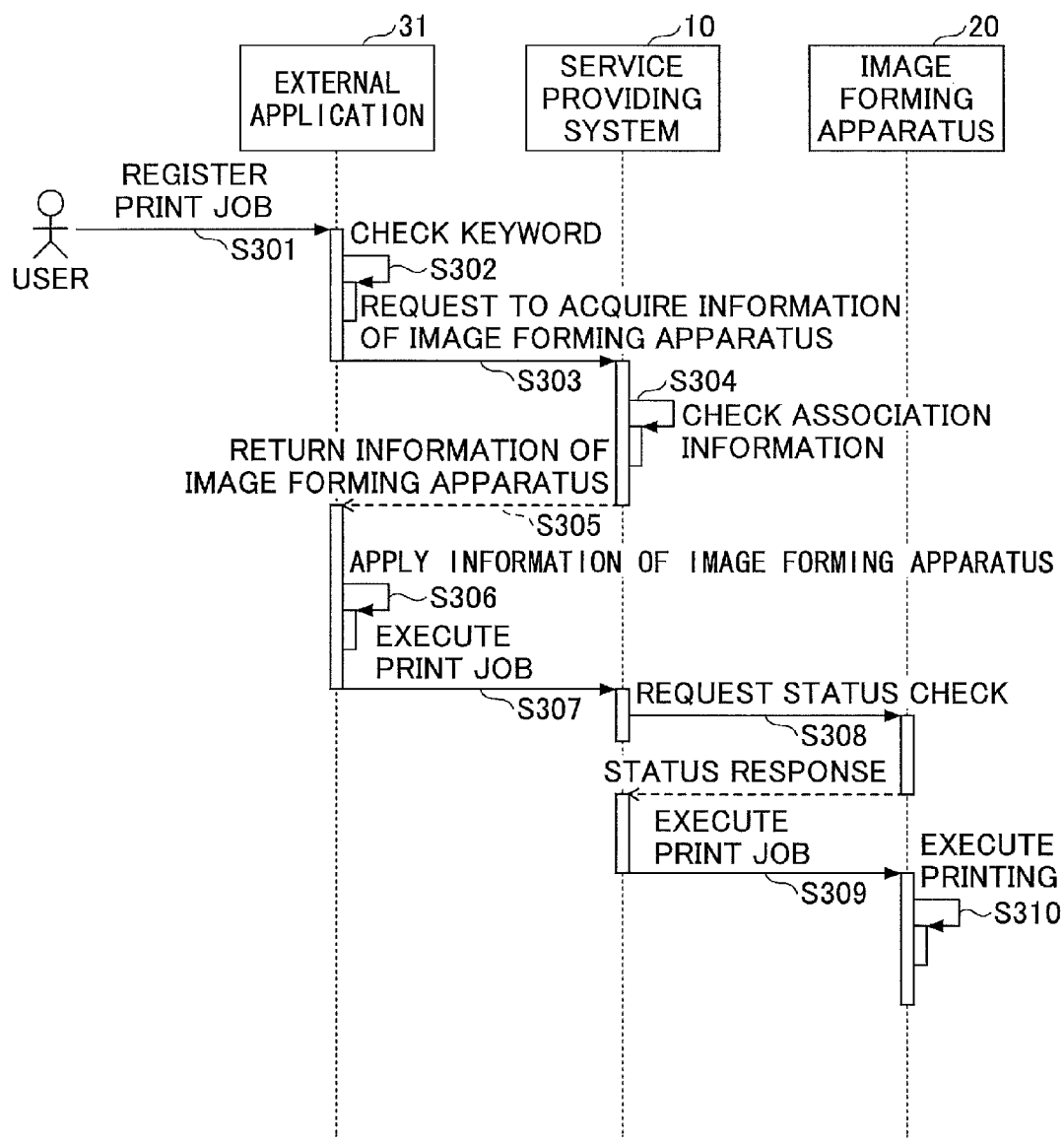
FIG. 34 is a sequence diagram illustrating an example of a print job registration and execution process according to the fourth embodiment of the present invention.

FIG. 34 is a sequence diagram illustrating an example of a print job registration and execution process according to the fourth embodiment of the present invention. In step S301, the user specifies the file that is the print target and requests the registration of a print job, in the external application 31 of the terminal device 30. Note that the user sets a keyword associated with the image forming apparatus 20 to be used for printing, as the file name of the file that is the print target.

FIG. 35 is a configuration diagram of an example of a print job to be registered according to the fourth embodiment of the present invention. The print job illustrated in FIG. 35 includes file information, a print setting, and print data. The file information is information of a file such as a file name. The print setting is information of a print setting required for printing. The print data is the data that is actually used for printing.

In step S302, the external application 31 checks (keyword check) whether a particular keyword is included in the file name of the file that is the print target of the print job for which registration has been requested in step S301. For example, the external application 31 uses a keyword table as illustrated in FIG. 36, for the keyword check. FIG. 36 is a configuration diagram of an example of a keyword table according to the fourth embodiment of the present invention.

When a particular keyword is included in the file name of the file that is the print target, the external application 31 proceeds to step S303, specifies the included keyword, and requests the service providing system 10 to acquire information of the image forming apparatus 20. The request to acquire information of the image forming apparatus 20 in which a keyword is specified is made by using, for example, the job API 302 of the service providing system API 301 prepared in the service providing system 10.

In step S304, the job API 302 passes the keyword specified in the request to acquire information of the image forming apparatus 20, to the input output service processing unit 103, and requests the input output service processing unit 103 to provide information of the image forming apparatus 20 (for example, an image forming apparatus ID, etc.) associated with the keyword. For example, the command processing unit 312 of the input output service processing unit 103 checks the association information illustrated in FIG. 37 to acquire the information of the image forming apparatus 20 associated with the keyword.

FIG. 37 is a configuration diagram of an example of association information according to the fourth embodiment of the present invention. In the association information of FIG. 37, information of the image forming apparatus 20, a keyword, position information of the image forming apparatus 20, and information of a substitute device are associated with each other. The information of a substitute device is information of the image forming apparatus 20 that is a candidate device for performing printing instead, when the image forming apparatus 20 associated with the keyword is in a state of being unable to perform printing.

In the example of FIG. 37, when the image forming apparatus 20 of "Abcdefg1002" is in a state of being unable to perform printing, the image forming apparatus 20 of "Abcdefg1001" is a candidate device for performing printing instead. Furthermore, in the example of FIG. 37, when the image forming apparatus 20 of "Abcdefg1001" is in a state of being unable to perform printing, the image forming apparatus 20 of "Abcdefg1000" is a candidate device for performing printing instead.

Note that in the example of FIG. 37, no substitute devices are set for the image forming apparatus 20 of "Abcdefg1000". In the present embodiment, when the image forming apparatus 20 does not have a substitute device set as in the example of the image forming apparatus 20 of "Abcdefg1000", and the image forming apparatus 20 without a substitute device in a state of being unable to perform printing, the printing operation is changed to a printing operation according to the temporary code as described above.

Furthermore, when registering the image forming apparatus 20, the position information included in the association information of FIG. 37 is used for presenting, to the user, another image forming apparatus 20 near the registered image forming apparatus 20 as a candidate substitute device.

In step S305, the service providing system 10 returns the information of the image forming apparatus 20 associated with a keyword, to the external application 31 of the terminal device 30. After step S305, the process proceeds to step S306, and the external application 31 applies the information of the image forming apparatus 20 returned in step S305, to a print job as the information of the image forming apparatus 20 that is a candidate device for performing printing. In step S307, the external application 31 requests the service providing system 10 to execute the print job.

In step S308, the status checking unit 421 of the service providing system 10 requests the image forming apparatus 20 that is the candidate device for performing printing, to perform status check. The image forming apparatus 20 that has received the status check request checks whether the image forming apparatus 20 is in a state of being able to perform printing by status check, and returns a response indicating the result. Here, it is assumed that the service providing system 10 receives a response indicating that the image forming apparatus 20 in a state of being able to perform printing. The service providing system 10 has confirmed that the image forming apparatus 20 is able to print, and therefore proceeds to step S309, and requests the image forming apparatus 20 that is the candidate device for performing printing to execute the print job. In step S310, the image forming apparatus 20 executes printing of the file of the print data based on the requested print job.

Note that in step S302 of FIG. 34, when a particular keyword is not included in the file name of the file that is the print target as a result of the keyword check, the external application 31 changes the printing operation to a printing operation according to the temporary code as described above.

Figure 38:
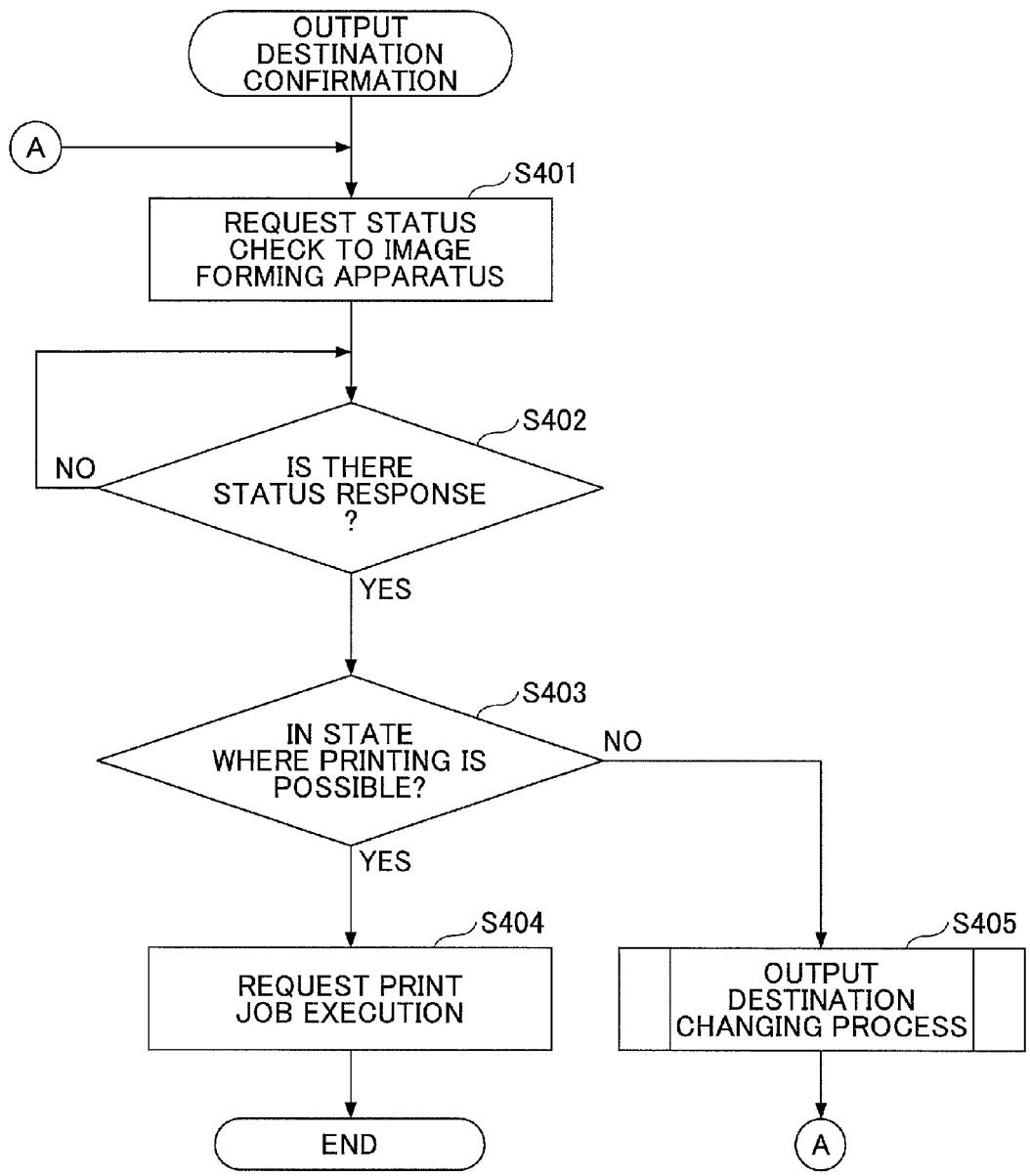
FIG. 38 is a flowchart of an example of an output destination confirmation process according to the fourth embodiment of the present invention.

The output destination confirmation process indicated in steps S308 and S309 of FIG. 34 are performed, for example, as illustrated in FIG. 38. FIG. 38 is a flowchart of an example of an output destination confirmation process according to the fourth embodiment of the present invention. In step S401, the service providing system 10 requests the image forming apparatus 20 that is the candidate device for performing printing, to perform status check. In step S402, the service providing system 10 waits for a response indicating the result of the status check.

When a response indicating the result of the status check is received, the service providing system 10 proceeds to step S403, and determines whether the image forming apparatus 20 that is the candidate device for performing printing is in a state of being able to perform printing, based on the response indicating the result of the status check. When the image forming apparatus 20 that is the candidate device for performing printing is in a state of being able to perform printing, the service providing system 10 proceeds to step S404, and requests the image forming apparatus 20 that is the candidate device for performing printing to execute a print job. When the image forming apparatus 20 that is the candidate device for performing printing is not in a state of being able to perform printing, the service providing system 10 proceeds to step S405, performs an output destination changing process described below, and then returns to step S401 and continues the process.

According to the output destination confirmation process of FIG. 38, the service providing system 10 is able to request the image forming apparatus 20 that is the candidate device for performing printing and that is in a state of being able to perform printing, to execute a print job.

Figure 39:
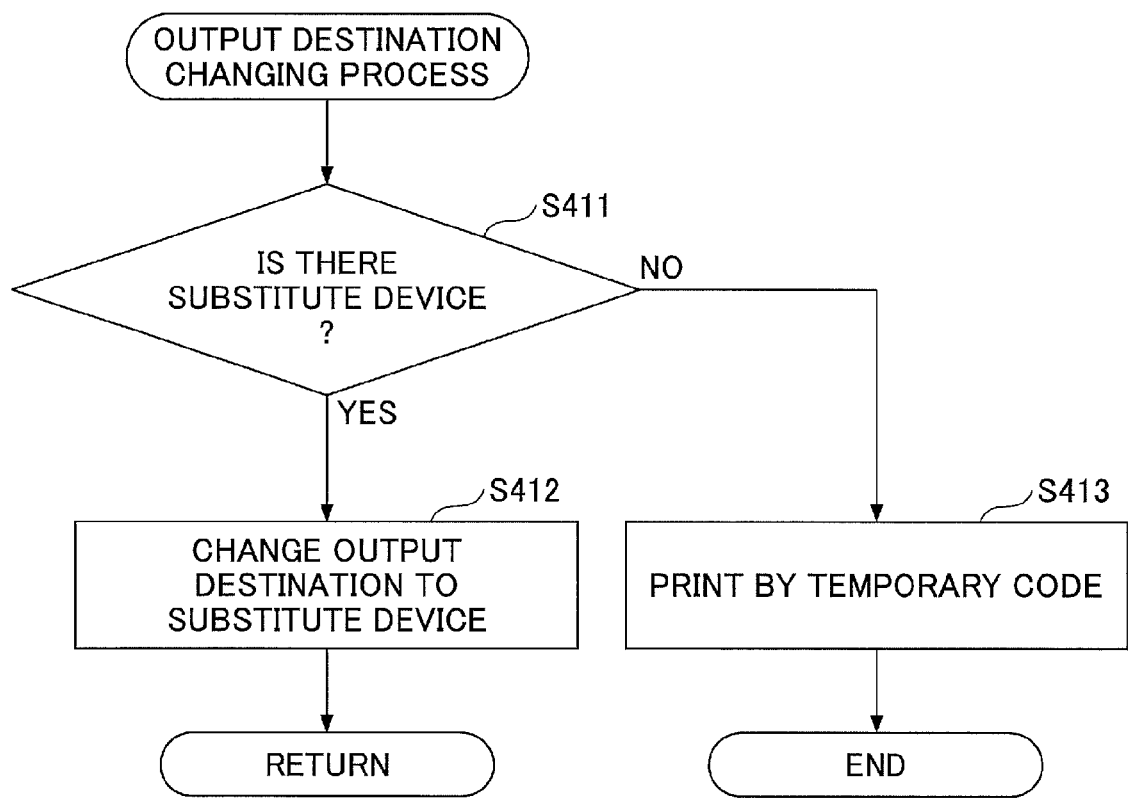
FIG. 39 is a flowchart of an example of an output destination changing process according to the fourth embodiment of the present invention.

FIG. 39 is a flowchart of an example of an output destination changing process according to the fourth embodiment of the present invention. In step S411, the service providing system 10 refers to the association information of FIG. 37 and determines whether a substitute device is set. When a substitute device is set, the service providing system 10 proceeds to step S412, changes the output destination to the substitute device (the image forming apparatus 20 that is the candidate device for performing printing), and returns to the output destination confirmation process of FIG. 38. Note that when a substitute device is not set, the service providing system 10 proceeds to step S413 and shifts to a printing operation according to the temporary code as described above.

Figure 40:
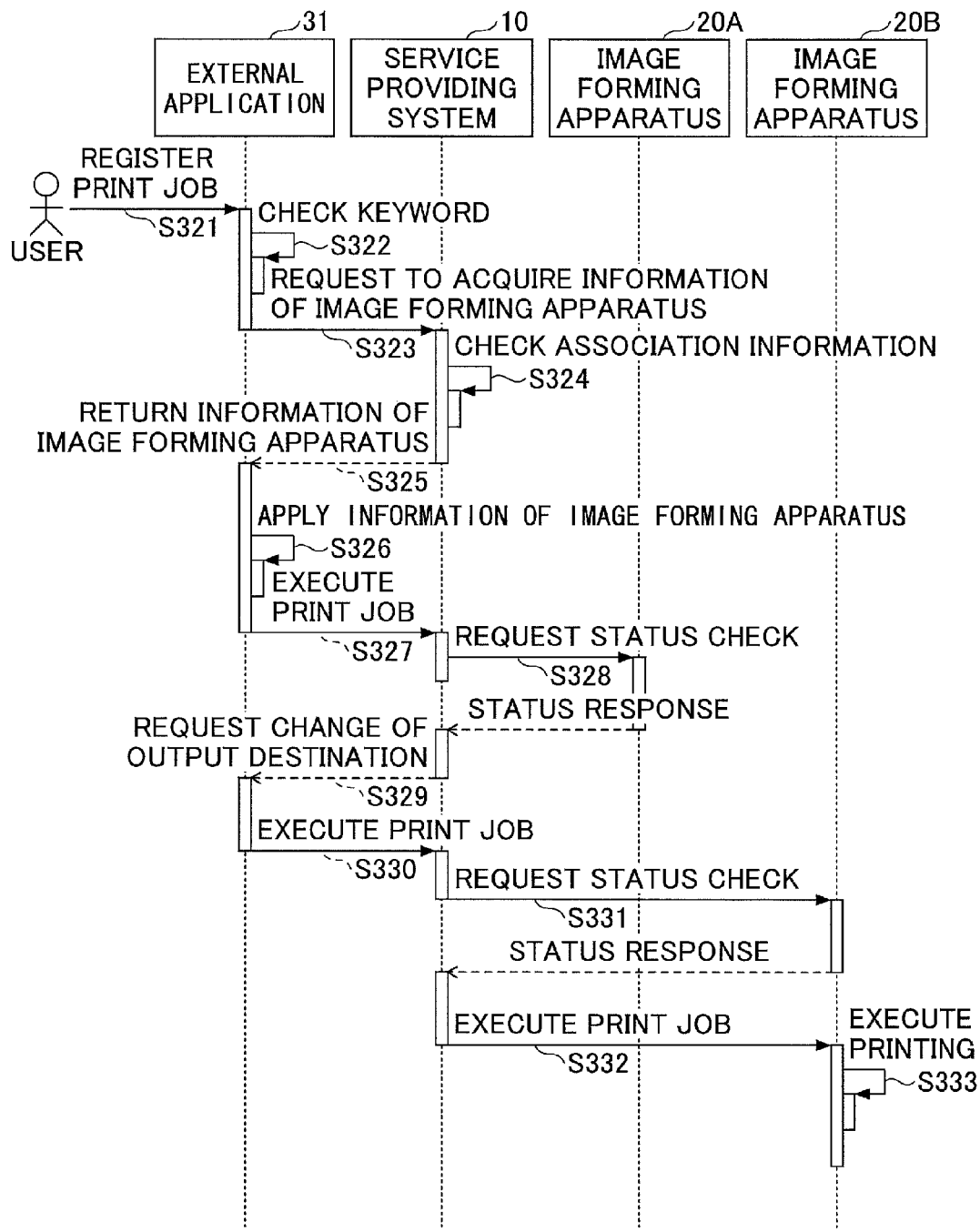
FIG. 40 is a sequence diagram illustrating another example of a print job registration and execution process according to the fourth embodiment of the present invention.

FIG. 40 is a sequence diagram illustrating another example of a print job registration and execution process according to the fourth embodiment of the present invention. The sequence diagram of FIG. 40 indicates a case where a response indicating a state of being unable to perform printing, is received in the sequence diagram of FIG. 34.

The processes of steps S321 through S327 are the same as the processes of steps S301 through S307 of FIG. 34. In step S328, the service providing system 10 requests the image forming apparatus 20A that is the candidate device for performing printing to perform status check. The image forming apparatus 20A that has received the status check request checks whether the image forming apparatus 20A is in a state of being able to perform printing by status check, and returns a response indicating the result. Here, it is assumed that the service providing system 10 receives a response indicating that the image forming apparatus 20A in a state of being unable to perform printing.

The service providing system 10 has confirmed that the image forming apparatus 20A is unable to print, and therefore performs the output destination changing process of FIG. 39, and changes the output destination to image forming apparatus 20B, which is set as the substitute device of the image forming apparatus 20A. In step S329, the service providing system 10 requests the external application 31 of the terminal device 30 to change the output destination to the image forming apparatus 20B. According to need, the external application 31 confirms with the user as to whether to change the output destination.

In step S330, the external application 31 applies the information of the image forming apparatus 20B to which the output destination has been changed, to the print job as a candidate device for performing printing. In step S330, the external application 31 requests the service providing system 10 to execute the print job. In step S331, the service providing system 10 requests the image forming apparatus 20B that is the candidate device for performing printing to perform status check. The image forming apparatus 20B that has received the status check request checks whether the image forming apparatus 20B is in a state of being able to perform printing by status check, and returns a response indicating the result. Here, it is assumed that the service providing system 10 receives a response indicating that the image forming apparatus 20B in a state of being able to perform printing.

The service providing system 10 proceeds to step S332, and requests the image forming apparatus 20B that is the candidate device for performing printing, to execute the print job. In step S333, the image forming apparatus 20B executes printing of the file of the print data based on the requested print job.

As described above, in the information processing system 1 according to the fourth embodiment of the present invention, the user applies a particular keyword associated with the image forming apparatus 20 to the file information of the file that is the print target. Accordingly, the service providing system 10 is able to identify the image forming apparatus 20 to perform printing.

Furthermore, the information processing system 1 according to the fourth embodiment of the present invention is able to confirm whether the image forming apparatus 20 that is identified by the particular keyword is in a state of being able to print. When the image forming apparatus 20 is not in a state of being able to print, the information processing system 1 according to the fourth embodiment of the present invention is able to change the image forming apparatus to perform printing to a substitute device or change the printing operation to a printing operation according to the temporary code as described above.

The flow control unit 113 is an example of a flow controller. The instruction distributing unit 115 is an example of a print instruction distributor. The print instruction component 124 is an example of a print instructor. The authentication managing unit 104 is an example of an authentication manager. The print conversion component 121 is an example of a print converter. The data managing unit 112 is an example of a data manager.

According to one embodiment of the present invention, a service providing system is capable of supporting the development of a service to perform a process in cooperation with an image forming apparatus.

The service providing system, the cooperation processing method, and the information processing system are not limited to the specific embodiments described in the detailed description, and variations and modifications may be made without departing from the spirit and scope of the present invention.

What is claimed is:

1. A service providing system including a plurality of information processing apparatuses, the service providing system providing a service in which the plurality of information processing apparatuses and an image forming apparatus cooperate with each other to execute a series of processes for performing printing, the service providing system comprising:
    a plurality of processors configured to execute, by a computer, the series of processes for performing printing in the image forming apparatus;
    a flow controller configured to accept, from one of the plurality of information processing apparatuses over a communication channel, a print execution request to execute printing in the image forming apparatus, and to cause the plurality of processors to issue a print instruction to be provided to the image forming apparatus, based on a flow setting and a parameter setting of the series of processes for performing printing included in the print execution request; and
    a print instruction distributor configured to distribute, over the communication channel, the print instruction to the image forming apparatus based on a print instruction acquisition request to acquire the print instruction received from the image forming apparatus over the communication channel, the print instruction acquisition request being generated according to information input to a screen of a user interface included in the image forming apparatus by a user, wherein
    the plurality of processors include a print instructor configured to issue the print instruction and to store the issued print instruction in a storage device of the print instruction distributor.

2. The service providing system according to claim 1, further comprising:
    an authentication manager configured to issue unique code information according to a request from the print instructor, wherein
    the print instructor returns the code information issued by the authentication manager to the one of the plurality of information processing apparatuses from which the print execution request has been accepted, and stores the print instruction in association with the code information in the print instruction distributor, and the print instruction distributor distributes the print instruction associated with the code information to the image forming apparatus, based on the print instruction acquisition request, which specifies the code information, from the image forming apparatus.

3. The service providing system according to claim 1, further comprising:

an authentication manager configured to authenticate a user who has made the print execution request from the one of the plurality of information processing apparatuses, and to issue authentication information expressing a result of the authentication, wherein the print instructor stores the print instruction in association with the authentication information in the print instruction distributor, and the print instruction distributor distributes the print instruction associated with the authentication information to the image forming apparatus, based on the print instruction acquisition request, which specifies the authentication information, from the image forming apparatus to acquire a list of the print instructions.

4. The service providing system according to claim 1, wherein the plurality of processors include a print converter configured to convert a format of electronic data that is a target of the print instruction, based on the flow setting and the parameter setting.

5. The service providing system according to claim 2, further comprising:

a data manager configured to store electronic data that is a target of the print instruction in association with the code information according to a request from the print instructor, wherein the data manager returns the electronic data associated with the code information to the image forming apparatus, based on an electronic data acquisition request, which specifies the code information, from the image forming apparatus to acquire the electronic data that is the target of the print instruction.

6. The service providing system according to claim 3, further comprising:

a data manager configured to store electronic data that is a target of the print instruction in association with the authentication information according to a request from the print instructor, wherein the data manager returns the electronic data associated with the authentication information to the image forming apparatus, based on an electronic data acquisition request, which specifies the authentication information, from the image forming apparatus to acquire the electronic data that is the target of the print instruction.

7. The service providing system according to claim 1, wherein the print instruction includes state information expressing a state of the print instruction, the print instruction distributor updates the state of the print instruction based on an instruction state change request from the image forming apparatus, and the print instruction distributor selects the print instruction based on the state of the print instruction and distributes the selected print instruction to the image forming apparatus, when the print instruction acquisition request is accepted from the image forming apparatus.

8. A computer-implemented method executed in a service providing system providing a service for cooperating with an image forming apparatus to execute a series of processes for performing printing, the method comprising:

executing, by a computer, the series of processes for performing printing in the image forming apparatus;

accepting, from a terminal device over a communication channel, a print execution request to execute printing in the image forming apparatus;

issuing a print instruction to be provided to the image forming apparatus, based on a flow setting and a parameter setting of the series of processes for performing printing included in the print execution request; and distributing, over the communication channel, the print instruction to the image forming apparatus based on a print instruction acquisition request to acquire the print instruction received from the image forming apparatus over the communication channel, the print instruction acquisition request being generated according to information input to a screen of a user interface included in the image forming apparatus by a user, wherein the executing of the series of processes includes issuing the print instruction and storing the issued print instruction in a storage device.

9. An information processing system comprising:

an image forming apparatus;

a service providing system configured to provide a service for cooperating with an image forming apparatus to execute a series of processes for performing printing; and a terminal device, wherein the service providing system includes:

a plurality of processors configured to execute, by a computer, the series of processes for performing printing in the image forming apparatus;

a flow controller configured to accept, from the terminal device over a communication channel, a print execution request to execute printing in the image forming apparatus, and to cause the plurality of processors to issue a print instruction to be provided to the image forming apparatus, based on a flow setting and a parameter setting of the series of processes for performing printing included in the print execution request; and a print instruction distributor configured to distribute, over the communication channel, the print instruction to the image forming apparatus based on a print instruction acquisition request to acquire the print instruction received from the image forming apparatus over the communication channel, wherein the plurality of processors include a print instructor configured to issue the print instruction and to store the issued print instruction in a storage device of the print instruction distributor, and wherein the image forming apparatus includes a screen of a user interface configured to accept information input by a user to generate the print instruction acquisition request, and wherein the terminal device includes an external application configured to input the print execution request to the flow controller included in the service providing system.

* * * * *